United States Patent
Chircop

(10) Patent No.: US 10,831,385 B2
(45) Date of Patent: *Nov. 10, 2020

(54) SYSTEM AND METHOD FOR MANAGING VOLUMES OF DATA IN A BLOCK STORAGE SYSTEM

(71) Applicant: StorageOS Limited, London (GB)

(72) Inventor: Alex Chircop, Buckinghamshire (GB)

(73) Assignee: StorageOS Limited, London (GB)

( * ) Notice: Subject to any disclaimer, the term of this patent is extended or adjusted under 35 U.S.C. 154(b) by 208 days.

This patent is subject to a terminal disclaimer.

(21) Appl. No.: 15/955,550

(22) Filed: Apr. 17, 2018

(65) Prior Publication Data

US 2018/0300325 A1   Oct. 18, 2018

Related U.S. Application Data

(60) Provisional application No. 62/486,425, filed on Apr. 17, 2017.

(51) Int. Cl.
| | |
|---|---|
| *G06F 3/06* | (2006.01) |
| *G06F 9/50* | (2006.01) |
| *G06F 16/16* | (2019.01) |
| *G06F 16/903* | (2019.01) |

(52) U.S. Cl.
CPC .......... *G06F 3/0631* (2013.01); *G06F 3/061* (2013.01); *G06F 3/064* (2013.01); *G06F 3/0623* (2013.01); *G06F 3/0656* (2013.01); *G06F 9/5027* (2013.01); *G06F 16/164* (2019.01); *G06F 16/903* (2019.01); *G06F 16/90335* (2019.01)

(58) Field of Classification Search
None
See application file for complete search history.

(56) References Cited

U.S. PATENT DOCUMENTS

| | | | |
|---|---|---|---|
| 7,225,314 B1* | 5/2007 | Bonwick | G06F 16/1744 711/170 |
| 10,185,507 B1* | 1/2019 | Olson | G06F 3/0689 |
| 2010/0306270 A1* | 12/2010 | McDiarmid | G06F 16/284 707/796 |
| 2014/0250322 A1 | 9/2014 | Fleischmann et al. | |
| 2016/0004449 A1 | 1/2016 | Lakshman et al. | |
| 2016/0004450 A1 | 1/2016 | Lakshman et al. | |
| 2016/0004451 A1 | 1/2016 | Lakshman et al. | |

(Continued)

OTHER PUBLICATIONS

VMware, Inc.; "vSphere Virtual Volumes Technical Overview", published Nov. 12, 2016, last updated on Feb. 22, 2017; 51 pgs.

*Primary Examiner* — Mark D Featherstone
*Assistant Examiner* — Samuel C Sharpless, III
(74) *Attorney, Agent, or Firm* — Loza & Loza, LLP

(57) ABSTRACT

Methods and systems for handling requests for data corresponding to a volume of data are disclosed. A method involves generating meta data corresponding to a volume of data, the meta data including a set of range status registers, wherein each range status register corresponds to a unique range of memory in the volume of data, wherein the state of a range status register indicates whether or not data has been persisted within the range of memory that corresponds to the range status register and processing a request for a retrieve operation from the volume of data or for a persist operation to the volume of data as a function of a range status register in the meta data that corresponds to the request.

20 Claims, 14 Drawing Sheets

(56) References Cited

U.S. PATENT DOCUMENTS

| | | |
|---|---|---|
| 2016/0004466 A1 | 1/2016 | Lakshman |
| 2016/0004480 A1 | 1/2016 | Lakshman |
| 2016/0004481 A1 | 1/2016 | Lakshman |
| 2016/0004603 A1 | 1/2016 | Lakshman |
| 2016/0004611 A1 | 1/2016 | Lakshman et al. |
| 2016/0011972 A1 | 1/2016 | Flynn et al. |
| 2016/0359955 A1 | 12/2016 | Gill et al. |
| 2016/0378401 A1 | 12/2016 | Savic et al. |
| 2017/0344274 A1 | 11/2017 | Lakshman et al. |
| 2017/0351695 A1 | 12/2017 | Rao et al. |
| 2017/0351743 A1 | 12/2017 | Jayaraman et al. |
| 2018/0018116 A1 | 1/2018 | Hallisey |
| 2018/0246676 A1* | 8/2018 | Schreter ................ G06F 3/0679 |
| 2019/0095389 A1* | 3/2019 | Barnes .................... G06F 9/345 |

\* cited by examiner

SYSTEM AND METHOD FOR MANAGING VOLUMES OF DATA IN A BLOCK STORAGE SYSTEM

CROSS-REFERENCE TO RELATED APPLICATION

This application is entitled to the benefit of provisional U.S. Patent Application Ser. No. 62/486,425, filed Apr. 17, 2017, entitled "Virtualization of Volumes of Data in a Storage System," which is incorporated by reference herein.

FIELD OF THE INVENTION

The present invention relates generally to data storage systems and methods for storing data.

BACKGROUND OF THE INVENTION

In the field of distributed computer systems, resources are made available for use by computer applications. Computer applications may require different computer resource types, such as CPU, memory, network, and data storage. Resources from multiple computer systems may be aggregated into one or more resource pools. Resource requests may include multiple resource types.

Computer systems are often virtualized. This functionality can be achieved with various different hardware and software elements that allow a computer system to run multiple instances of software to efficiently utilize the computer systems. Computer system virtualization is often provided by vendors as a service to allow the running of computer application on computer systems managed by a vendor. A computer system that has been virtualized is often referred to as a virtual machine or VM. The term virtual machine or VM can be used interchangeably with the term computer system.

In a computer system, a computer application will persist data that needs to be stored for future retrieval in a data storage system. The data that needs to be stored will be organized into files and databases.

Files and databases can be grouped into logical representations known as volumes of data. Volumes of data can contain one or more files or databases. In a volume of data, typically, the smallest logical unit of storage is a data block, which typically is up to a few thousand bytes of data. A data block is the unit of data that is persisted to a storage system for future retrieval.

A storage system processes data blocks in groups known as volumes of data. A volume of data may also be referred to as a virtual disk, as when a storage system presents the volume of data to a computer application, the volume of data has the attributes and behavior of a disk device. A volume of data is a logical representation of a number of data blocks that are concatenated to form a larger set of data than can be stored as a group of data blocks. Typically, a storage system treats the volume of data as a single atomic unit.

SUMMARY

A method for handling requests for data corresponding to a volume of data is disclosed. The method involves generating meta data corresponding to a volume of data, the meta data including a set of range status registers, wherein each range status register corresponds to a unique range of memory in the volume of data, wherein the state of a range status register indicates whether or not data has been persisted within the range of memory that corresponds to the range status register and processing a request for a retrieve operation from the volume of data or for a persist operation to the volume of data as a function of a range status register in the meta data that corresponds to the request.

In an embodiment, processing a request for a retrieve operation from the volume of data involves: when the range status register corresponding to the request is not set, returning an empty data block, and when the range status register corresponding to the request is set, returning the requested data from the volume of data.

In an embodiment, processing a request for a persist operation to the volume of data involves: when the range status register is not set and the requested data is formed entirely of zeros, ignoring the request for a persist operation; when the range status register is not set and the request to persist involves a request to delete the data, ignoring the delete request; and when the range status register is set and the requested data is formed entirely of zeros, translating the request to persist into a request to delete the data, and further comprising deleting the data from the volume of data.

In an embodiment, processing a request for a retrieve operation from the volume of data involves: when the range status register corresponding to the request is not set, returning an empty data block; when the range status register corresponding to the request is set, returning the requested data from the volume of data; and wherein processing a request for a persist operation to the volume of data involves: when the range status register is not set and the requested data is formed entirely of zeros, ignoring the request for a persist operation; when the range status register is not set and the request to persist involves a request to delete the data, ignoring the delete request; and when the range status register is set and the requested data is formed entirely of zeros, translating the request to persist into a request to delete the data, and further comprising deleting the data from the volume of data.

In an embodiment, the method further involves storing the meta data, including the set of range status registers, in the volume of data.

In an embodiment, generating meta data corresponding to a volume of data involves setting a range status register that corresponds to a unique range of memory in the volume of data once data has been persisted in the unique range of memory in the volume.

In an embodiment, the volume of data is a virtual volume of data.

In an embodiment, the volume of data is a physical volume of data.

In an embodiment, a non-transitory computer readable medium that stores computer executable code, which when executed by one or more processors, implements a method for handling requests for data corresponding to a volume of data is disclosed. The method involves generating meta data corresponding to a volume of data, the meta data including a set of range status registers, wherein each range status register corresponds to a unique range of memory in the volume of data, wherein the state of a range status register indicates whether or not data has been persisted within the range of memory that corresponds to the range status register, and processing a request for a retrieve operation from the volume of data or for a persist operation to the volume of data as a function of a range status register in the meta data that corresponds to the request.

In an embodiment, processing a request for a retrieve operation from the volume of data involves: when the range status register corresponding to the request is not set, returning an empty data block; and when the range status register corresponding to the request is set, returning the requested data from the volume of data.

In an embodiment, processing a request for a persist operation to the volume of data involves: when the range status register is not set and the requested data is formed entirely of zeros, ignoring the request for a persist operation; when the range status register is not set and the request to persist involves a request to delete the data, ignoring the delete request; and when the range status register is set and the requested data is formed entirely of zeros, translating the request to persist into a request to delete the data, and further comprising deleting the data from the volume of data.

In an embodiment, processing a request for a retrieve operation from the volume of data involves: when the range status register corresponding to the request is not set, returning an empty data block; when the range status register corresponding to the request is set, returning the requested data from the volume of data; and wherein processing a request for a persist operation to the volume of data involves: when the range status register is not set and the requested data is formed entirely of zeros, ignoring the request for a persist operation; when the range status register is not set and the request to persist involves a request to delete the data, ignoring the delete request; and when the range status register is set and the requested data is formed entirely of zeros, translating the request to persist into a request to delete the data, and further comprising deleting the data from the volume of data.

In an embodiment, the method further involves storing the meta data, including the set of range status registers, in the volume of data.

In an embodiment, generating meta data corresponding to a volume of data involves setting a range status register that corresponds to a unique range of memory in the volume of data once data has been persisted in the unique range of memory in the volume.

In an embodiment, the volume of data is a virtual volume of data.

In an embodiment, the volume of data is a physical volume of data.

In an embodiment, a method for handling requests for data corresponding to a volume of data is also disclosed. The method involves receiving a request to retrieve data from a volume of data or to persist data to the volume of data, and processing the request to retrieve data from the volume of data or to persist data to the volume of data as a function of a range status register that corresponds to the request, wherein the range status register is held as meta data that includes a set of range status registers, wherein each range status register corresponds to a unique range of memory in the volume of data, wherein the state of a range status register indicates whether or not data has been persisted within the range of memory that correspond to the range status register.

In an embodiment, processing a request for a retrieve operation from the volume of data involves: when the range status register corresponding to the request is not set, returning an empty data block; and when the range status register corresponding to the request is set, returning the requested data from the volume of data.

In an embodiment, processing a request for a persist operation to the volume of data involves: when the range status register is not set and the requested data is formed entirely of zeros, ignoring the request for a persist operation; when the range status register is not set and the request to persist involves a request to delete the data, ignoring the delete request; and when the range status register is set and the requested data is formed entirely of zeros, translating the request to persist into a request to delete the data, and further comprising deleting the data from the volume of data.

In an embodiment, the method further involves storing the meta data, including the set of range status registers, in the volume of data.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Embodiments of the present invention are illustrated by way of example, and not by way of limitation, in the figures of the accompanying drawings.

The invention, together with further advantages thereof, may best be understood by reference to the following description taken in conjunction with the accompanying drawings in which.

Throughout the description, similar reference numbers may be used to identify similar elements. Additionally, in some cases, reference numbers are not repeated in each figure in order to preserve the clarity and avoid cluttering of the figures.

DETAILED DESCRIPTION OF THE INVENTION

Figure 1:
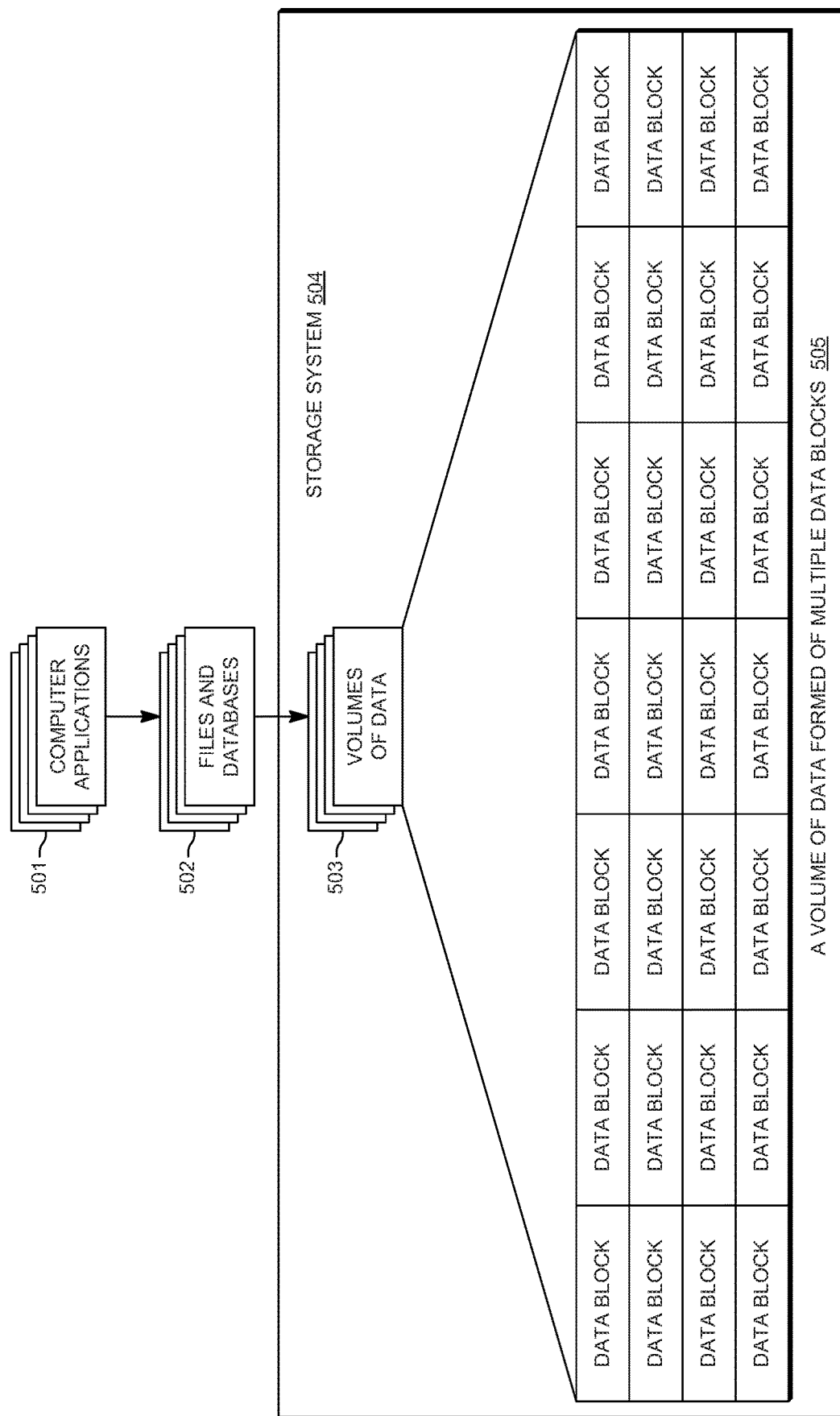
FIG. 1 illustrates the logical organization of storage data units including a computer application usage of one or more files and databases which are persisted in one or more volumes of data which are comprised of a number of data blocks.

A number of storage systems and techniques are disclosed.

Conventionally, storage systems provide a representation of a volume of data to a computer system in a specific and often propriety manner. In a distributed computer environment, multiple different storage systems from different vendors may be utilized to provide services and resources for applications, databases and files. Utilizing multiple different storage systems may have several drawbacks, including but not limited to: volumes of data may not be portable as the data in a volume may be encoded in different physical formats; volumes of data may not be portable as the data is accessed using techniques that are propriety to a specific storage system; the management of multiple different storage systems, each with individual access techniques and control methods, may result in significant additional complexity of a distributed computer system; and volumes of data may be stored inefficiently as storage systems may not be able to provide an optimal representation of the data as required by the computer application, resulting in the storage of unnecessary data blocks.

In some cases, it may be desirable to be able to: virtualize the access technique of storage to provide a consistent access method across a plurality of storage systems; virtualize the representation of blocks of data such that computer applications can utilize a consistent format of volumes of data across a plurality of physical volume formats; virtualize the representation of blocks with an efficient index of the volume of data to efficiently store the minimum number of data blocks to represent the data required by the computer application.

In some embodiments, the present application describes systems and methods for the virtualizing of volumes of data in a storage system and describes various embodiments of the systems and methods configured to: run a storage system alongside other applications in a computer system such that the storage system behaves like any other computer application; provide a method to dynamically route requests for blocks of data to be retrieved or persisted to a storage system though a set of persistence plugins that can operate across different types of computer resources; utilize a persistence plugin to access another virtual storage system to be able to process data on a remote computer resource in a distributed computer system; and even when operating on remote computer resources in a distributed computer system, provide a technique for a local data plane to implement data encoding to improve efficiency and security of the stored and retrieved data blocks.

Also disclosed is a method for normalizing requests for data blocks to be retrieved or persisted to a storage system such that the requests can be aligned to the data block sizes used by physical computer resources and provide an abstraction of the virtual volumes, allowing the volumes to be portable across multiple computer systems.

Also disclosed are methods to improve efficiency of the computer resources that are utilized in a storage system by reducing the number of operations and the number of data blocks that are persisted and retrieved from the computer resources.

Also disclosed are methods to improve efficiency of the computer resources that are utilized in a storage system by ensuring that only the minimum data blocks required to retrieve data from a volume are actually persisted to the volume of data.

In an embodiment, a method for storing data in volumes of data that are normalized and stored within a physical representation of the data on a plurality of physical storage systems.

FIG. 1 illustrates the logical organization of an example data storage system. A number of computer applications 501 will create, update, and delete a number of files and databases 502 as part of their normal operations. The files and databases are persisted in one or more volumes of data 503 within a storage system 504. The storage system 504 may include various different computer components and will process the volumes of data 503.

The volumes of data each include multiple data blocks 505 which are grouped together and identified by the volume. For example, FIG. 1 illustrates an expanded view of multiple data blocks that make up a single volume of data.

Figure 2:
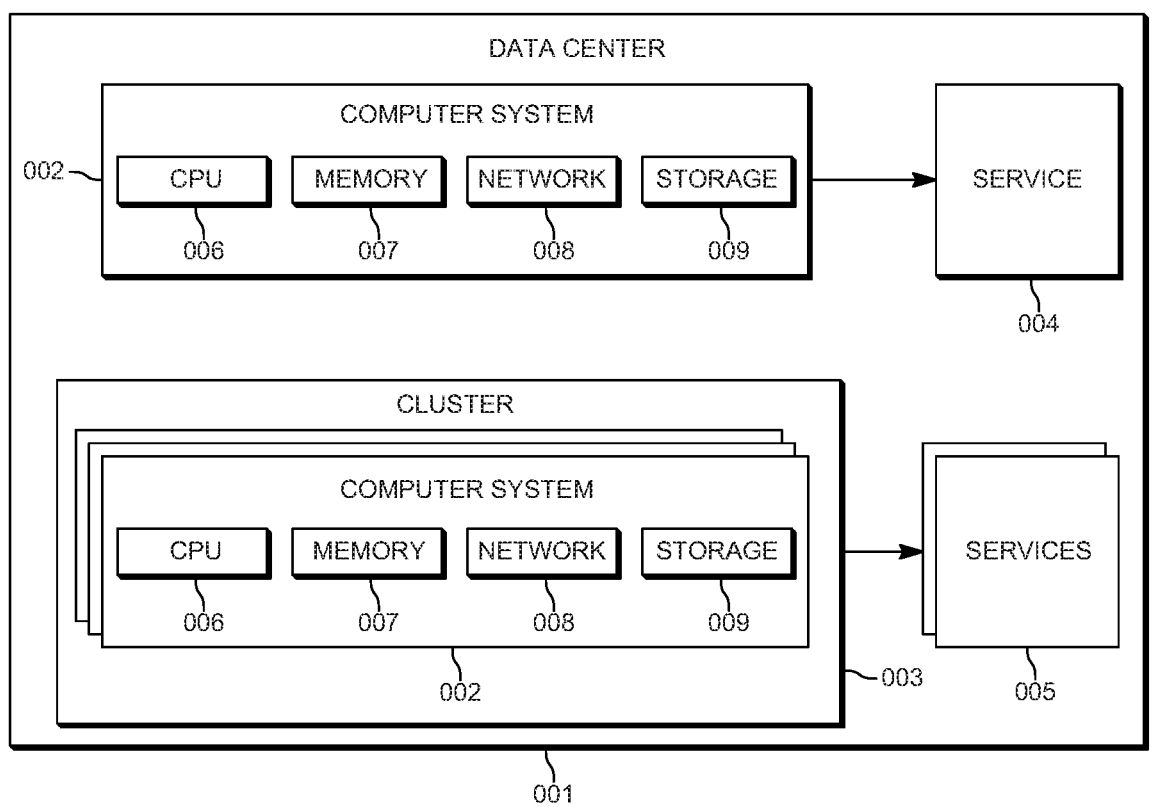
FIG. 2 illustrates the logical organization of computer systems and computer resources.

FIG. 2 illustrates computer resources that can be organized to provide services. In the example of FIG. 2, a computer system 002 has various resources, including but not limited to central processing unit (CPU) 006, memory 007, network 008, and storage 009. CPU is the processing capacity defined by the number and speed of the computer system's central processing unit(s), the memory can be physical memory, such as volatile memory (e.g., random access memory (RAM)), the network can include network interfaces (e.g., wireless, wire-based, optical, etc.), hubs, switches, routers, and the storage may include non-volatile memory such as a magnetic disk drive or a solid state drive (SSD).

A plurality of computer systems can be grouped or organized into a cluster 003. A plurality of computer systems or clusters can be organized into a datacenter 001. Datacenters can be owned and operated by the operator of the computer system, or may be operated as a service, such as a cloud service, by a 3rd-party vendor. Within a datacenter, a datacenter operator can organize one or more resources to create services 004, 005, where a service provides a specified function based on an operator defined specification. Example services include storage services, such as block storage system services.

The services may be further grouped and treated as functionally equivalent to an individual computer system's resources.

The techniques described herein are related to a storage system, such as a block storage system, but are not specific to any particular storage system or computer system and instead provide techniques for presenting a virtual representation of a volume of data that is mapped to a plurality of physical persisted data stores. For example, a virtual representation of a volume of data, also referred to as a "virtual volume of data," is a volume of data whose block structure (e.g., offset and block size) is distinct from or abstracted from an underlying volume of data, e.g., a "physical volume of data." Thus, an application can interact with a virtual volume of data (e.g., through requests to retrieve data from or persist data to the virtual volume of data) without having any knowledge of the operation and/or existence of an underlying physical volume of data.

In an embodiment, a technique described herein utilizes a storage system such that it behaves like a computer application and can therefore provide a virtual presentation of a volume of data to other applications on the computer system.

Additionally, the techniques described herein provide for an access method to volumes of data that are remote to the computer system.

The techniques described herein also include a technique to improve the efficiency of the storage of blocks of data of a volume such that a computer application is able to store the minimum number of data blocks to represent the data in the volume of data blocks.

Virtual Storage System

Figure 6:
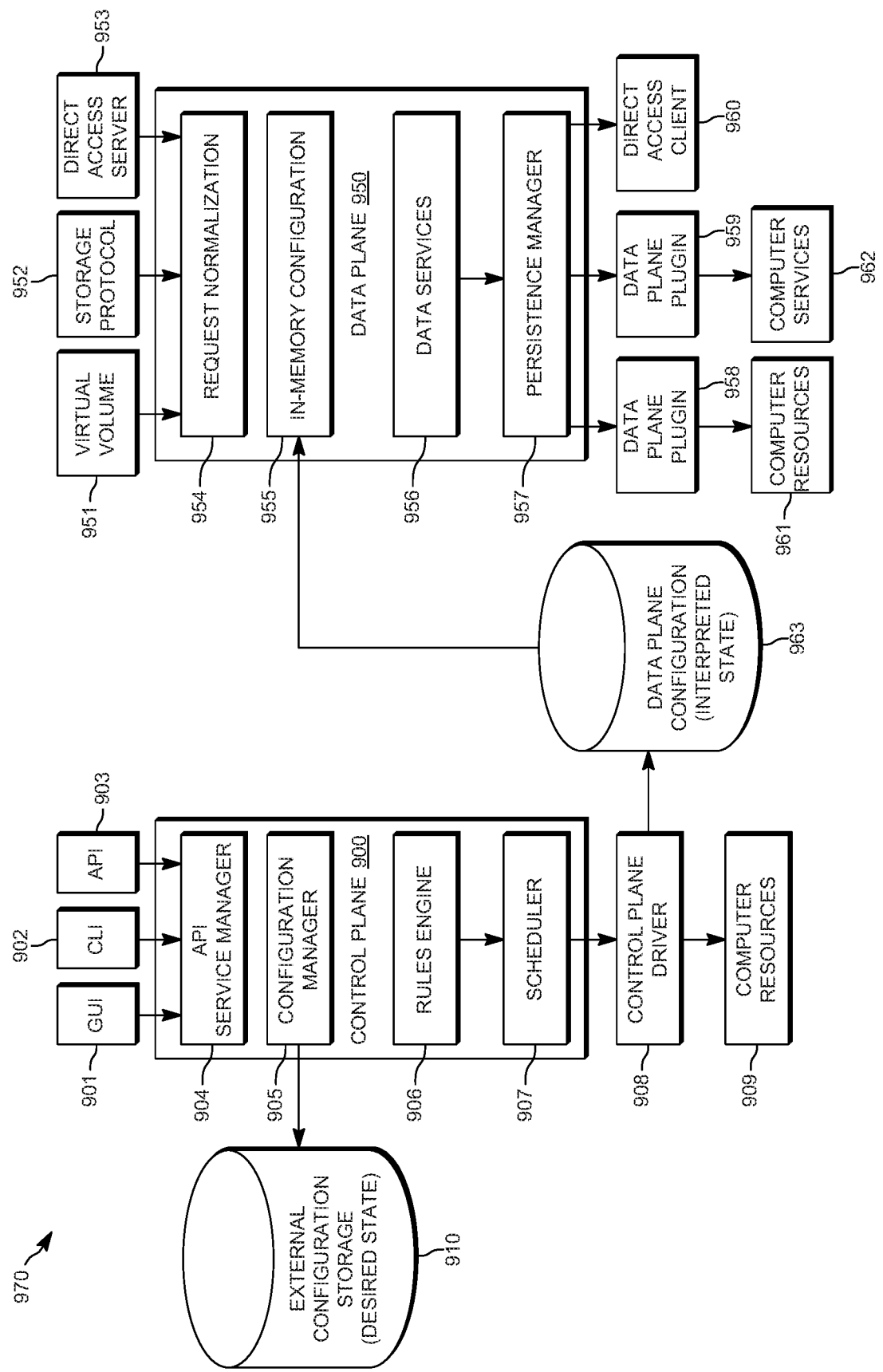
FIG. 6 illustrates an example of a representation of a storage system in accordance with an embodiment of the invention.

FIG. 6 illustrates components of a virtual storage system 970. The virtual storage system depicted in FIG. 6 is configured to access a physical storage medium, such as a disk or SSD, in the computer system as well as volumes available in the computer system, which are presented by other storage systems.

The virtual storage system shown in FIG. 6 can run as a computer application alongside other computer applications on an individual computer system or on a plurality of computer systems. An example of applications running alongside a storage system and virtual volumes of data is described with reference to FIG. 5. In an embodiment, the virtual storage system acts as an intermediate storage translation layer that interfaces between an application (e.g., application A 407 and application B 408) and underlying storage resources, e.g., physical storage resources such as magnetic disk drives and SSDs 406. In an embodiment, the storage system and/or the application are containerized applications.

The diagram of the data plane 950 of the storage system illustrates an example function of the storage system that presents virtual volumes of data 951 to computer applications and processes the retrieval and storage of each block of data from the application to the computer resources 961,962 where the block of data is ultimately persisted. The process of data retrieval and storage is commonly referred to as the data access path. For example, data retrieval and data storage occurs via a data access path that is set up between the virtual storage system and the corresponding physical storage system.

The control plane 900 of the storage system is responsible for managing the configuration of the storage array and establishing the configuration information 963 that is utilized as an in-memory configuration 955 by the data plane 950 as it processes blocks of data in the data access path. In an embodiment, "in-memory configuration" refers to state of data in volatile memory, such as RAM, that is utilized during execution of the control plane logic.

In one example of the control plane 900, the control plane 900 has an application programming interface (hereafter known as an API) that provides a set of functions and procedures that allow the creation of applications which access the features or configuration of the storage system. The API could be utilized by a user of the computer system or be accessed programmatically directly from another computer application. There may be multiple different access methods including, graphical user interface (GUI) 901, command line interface (CLI) 902, and application programming interface (API) 903, to access the API service manager 904 as managed by the control plane 900.

In another example of the control plane 900, the control plane includes a configuration manager 905 to manage the configuration of the data plane. The configuration may be stored outside of the control plane in external configuration storage 910. The configuration information stored in the external configuration storage 910 represents the desired state of the storage system as defined by a user or computer application via the API service manager 904. The control plane 900 could process the configuration information stored in the external configuration storage 910 and output data plane configuration information 963 that represents the interpreted configuration state of the data plane 950. The control plane may use features such a rules engine 906 to process the configuration and a control plane scheduler 907 would commit the data plane configuration 963 with a control plane driver 908. The scheduler 907 may also use the control plane driver 908 to discover the available computer resources 909 (e.g., physical computer resources) that could be utilized by the data plane 950.

The data plane 950 may support various techniques for exposing the virtual volumes of data 951 to computer applications and computer applications may utilize the virtual volumes 951 directly. Additionally, the data plane 950 may also be able to process and interpret existing storage protocols directly 952.

The data plane may implement a number of data services 956 based on the in-memory configuration 955 that would affect the processing of data blocks in the data plane 950. Data services 956 could include data encoding, compression, and/or encryption/decryption. Data may be encoded for a plurality of benefits including but not limited to: adding additional data to a data block to verify the validity of the data block; applying data reduction techniques and algorithms to reduce the size of the data block; and/or applying data cryptographic techniques and algorithms to scramble the data block for security purposes.

Data services 956 could also include replication of data which would allow the data plane 950 to instantiate multiple instances of the volume of data on different computer resources within the computer system that is executing the data plane 950 as well as other computer systems using the direct access client 960 and the direct access server 953.

The data plane 950 could utilize a number of computer resources to persist and retrieve blocks of data for virtual volumes. The data plane 950 may use a persistence manager 957. The persistence manager 957 could utilize configuration data (e.g., in-memory configuration 955) to decide which computer resources 961 and computer services 962 to utilize for the persistence and retrieval of data blocks using various different data plane plugins 958 and 959. Data plane plugins 958 and 959 support techniques and processes that allow the data plane 950 to access specific computer resources 961 and computer services 962. Using this process, the data plane is able to access computer resources or services and determine which set of resources and services as specified in the in-memory configuration 955 as determined by the control plane 900 based on the specification (e.g., the configuration information in the external configuration storage 910) as defined by a user or computer application of the storage system.

Additionally, in one example of the data plane 950, the data plane is configured to allow other data planes direct access to virtual volumes of data via a process that utilizes the direct access server 953. The direct access server would allow one data plane 950 to connect to another data plane 950 and request processing for the retrieval and persistence of blocks of data. The source data plane would utilize a process that involves the direct access client 960 connecting to the target data plane direct access server 953. The access path for the remote volume would be configurable as any other plugin, via the persistence manager 957. As described below, the data plane may include a request normalization function 954.

Methods of Accessing Volumes of Data

There are various different techniques by which a computer application can access a volume of data on a storage system.

Figure 3:
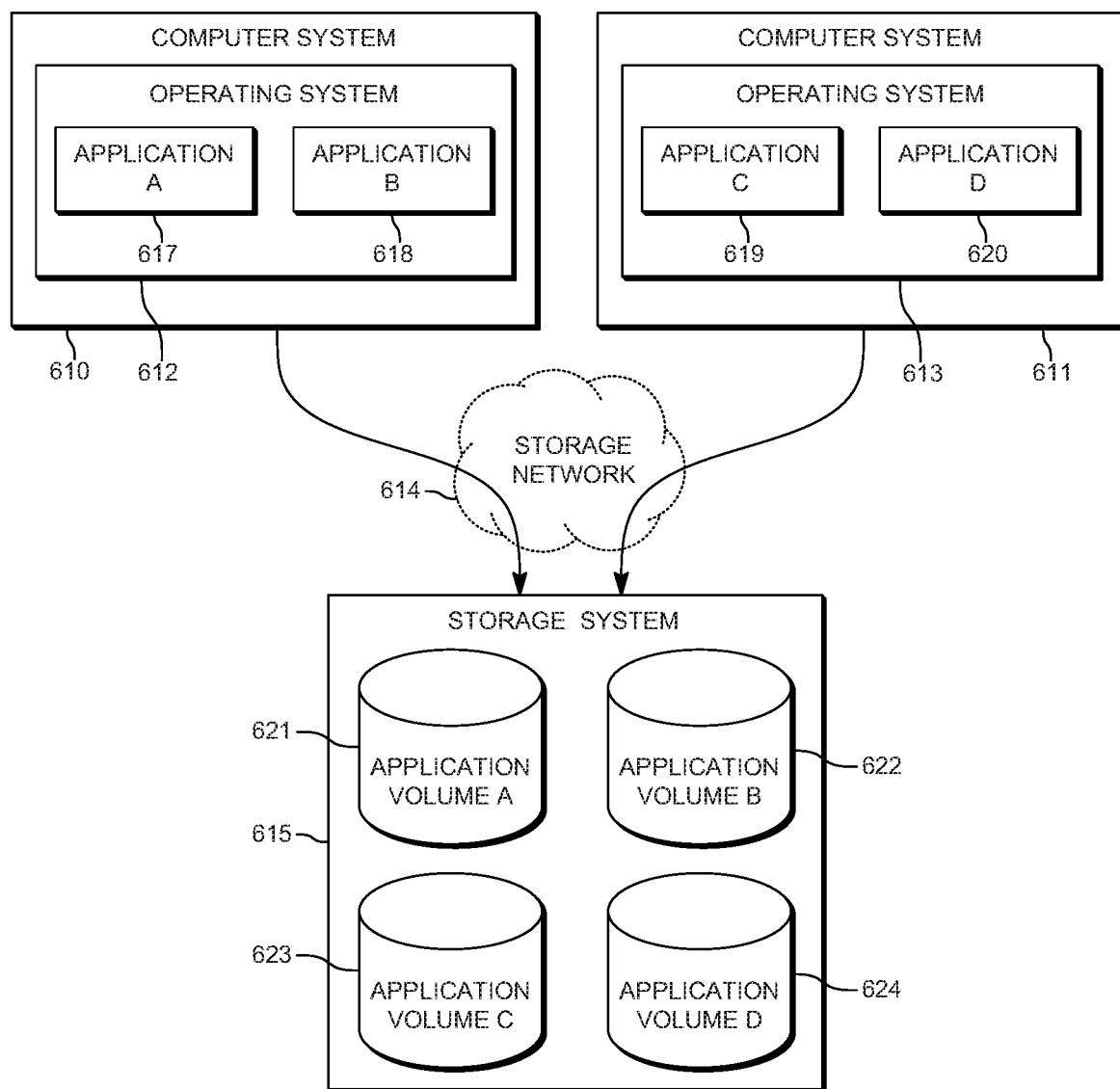
FIG. 3 illustrates an example of computer applications accessing a storage system over the network.

Storage systems are often centralized and provide volumes to computer systems via a network that provides connectivity between the computer systems and the storage system. FIG. 3 illustrates the access of volumes of data from computer systems 610 and 611 via a network 614 to a storage system 615. Computer applications 617, 618, 619, and 620 running on the computer systems 610 and 611 can then persist and retrieve data blocks for volumes 621, 622, 623, and 624 on the storage system 615.

Figure 4:
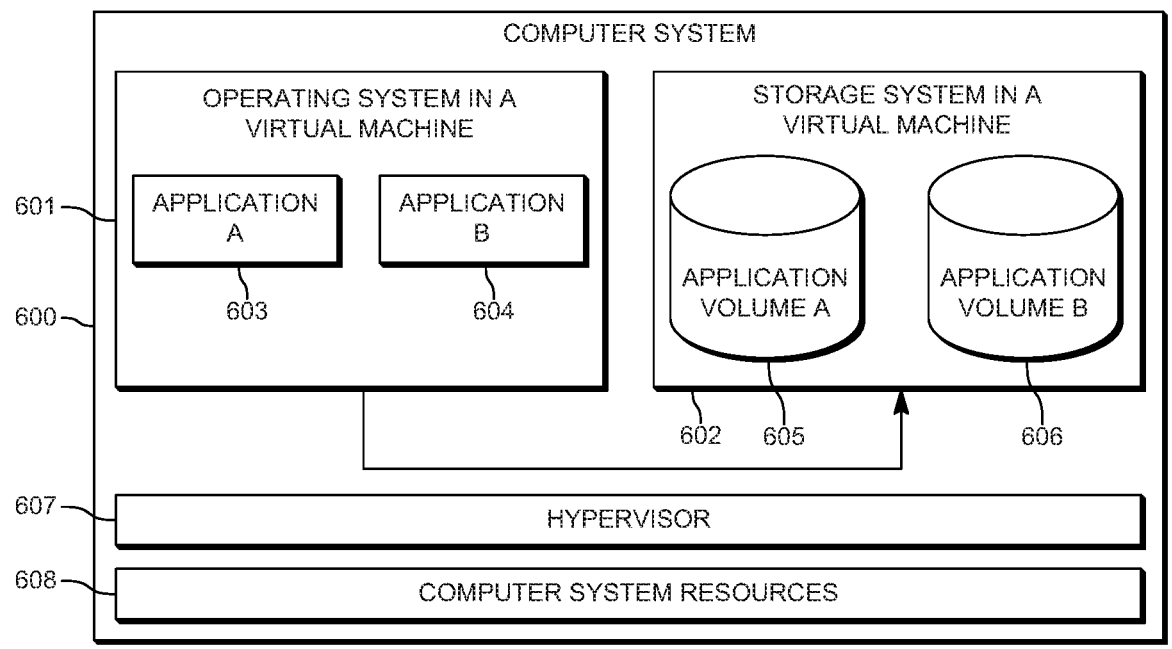
FIG. 4 illustrates an example of computer applications access a storage system within a virtualized computer system including the functionality of a hypervisor.

Storage systems, similarly to computer systems, can be virtualized and run as virtual machines in a single computer system running a hypervisor. A hypervisor is a software function that allows multiple virtual machines to share a computer system. FIG. 4 illustrates an example in which applications 603 and 604 in a virtual machine 601 are accessing the volumes 605 and 606 in a storage system 602. Both application and storage system share the same computer system and resources 608 through a hypervisor 607. Running a storage system in a virtual machine provides a method for the storage system to be more efficient by sharing the same resources as the computer application and may also remove the network dependencies of accessing a storage system via a network.

Each virtual machine that is run within a computer system utilizes numerous resources of the underlying computer system and can only provide a volume presentation to other virtual machines or computer systems using connectivity that is supported by the specific computer system that is persisting and retrieving data blocks from the storage system.

Figure 5:
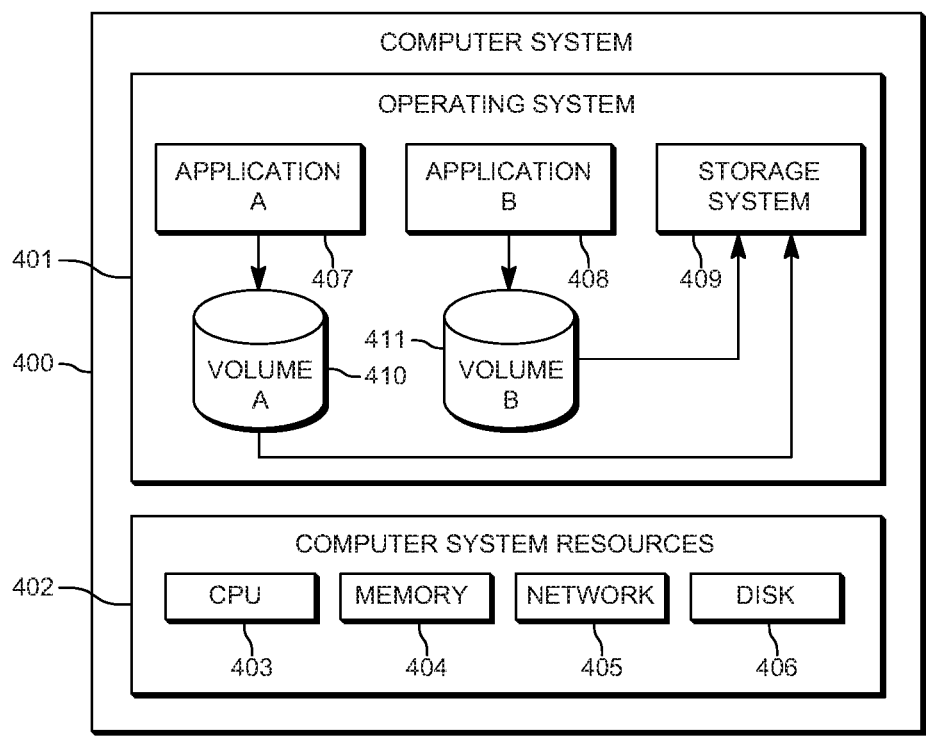
FIG. 5 illustrates an example of a representation of a storage system that runs alongside other computer applications in the same operating system instance in accordance with an embodiment of the invention.

FIG. 5 illustrates a technique for increasing the efficiency of a storage system by running the storage system 409 as a computer application that runs alongside the other applications 407, 408 in an individual operating system instance 401 (e.g., a single operating system instance). For example, as shown in FIG. 5, the applications A and B, the storage system, and the volumes A and B all share the same operating system instance and computer system resources that support the operating system. The storage system 409 can provide a native representation of the volumes of data 410, 411 such that any application can make use of the data locally to the running operating system instance 401. For example, data can be communicated between the applications, the storage system, and the volumes of data using a communications protocol that supports communications within the operating system. In this mode of operation, the storage system 409 can utilize the shared computer resources such as CPU 403, memory 404, network 405 and disk 406 local to the application instances 407 and 408.

Figure 9:
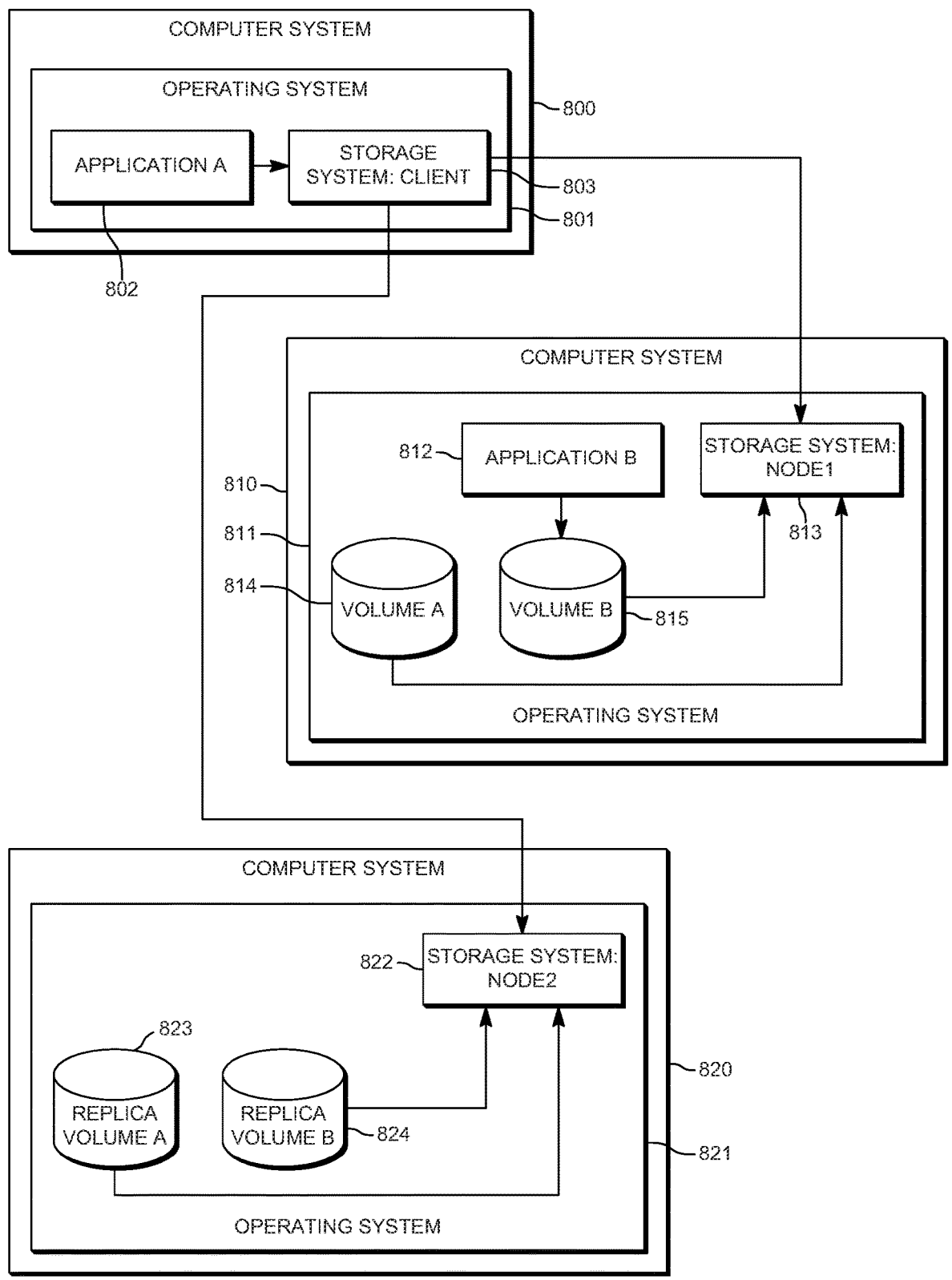
FIG. 9 illustrates an example of a storage system accessing resources from a remote storage system.

The embodiment of a virtual storage system utilizing techniques of storage access as described with reference to FIGS. 5, 6 and 9 provides various advantages. For example, a data plane 950 that manages the data path is local to the application data path for the volumes of data. This means that when accessing local computer system resources 403, 404, 405, and 406, the computer application will be able to access the volumes of data as fast as the local computer system 400 without any additional latency imposed by any storage protocols or network data path. In another example, a data plane 950 that manages the data path that is local to the application when configured with a data path that utilizes the direct access client 960 and the direct access server 953 of another data plane will alternatively allow the computer applications 407 and 408 to access the computer resources on another computer system. This allows the computer applications 407 and 408 to utilize volumes of data across a distributed computer system while still retaining a local presentation of the virtual volumes of data.

In a method of operation where a data plane 950 is accessing the computer resources of another computer system through the direct access client 960 and the direct access server 953, the local data plane instance in the local storage system 409 retains the ability to perform data services 956 such as encoding of data. This is advantageous because a local application can retain control of the operation of the data path providing security controls such as cryptographic algorithms independently of the characteristics of the remote storage system and the computer resources being shared in a distributed computer system.

Data Access Path

Figure 7:
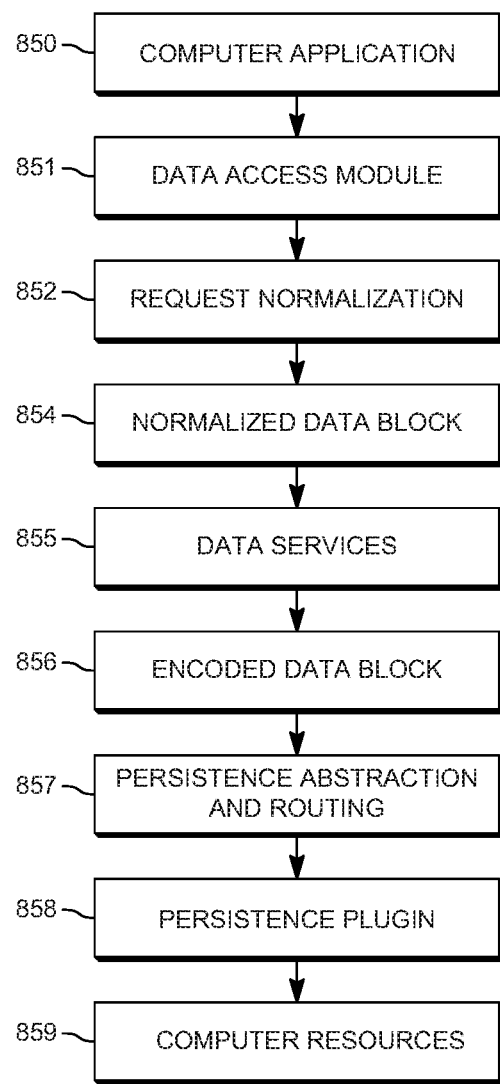
FIG. 7 is a flow diagram representing steps that facilitate the access of a data block through a storage system in accordance with an embodiment of the invention.

FIG. 7 illustrates the data access path of a data block as a computer application 850 requests data to be retrieved and persisted through the data plane of a storage system managing computer resources.

The data plane presents the virtual volumes of data through a data access module 851 which are consumed by computer applications 850. The computer application issues requests to retrieve or persist data to the storage system via the data access module 851.

The requests for data may not be for whole data blocks but may be for partial data blocks or multiple data blocks. In an embodiment, the data plane normalizes each request 852 such that the request is reformed to consist of one or more whole data blocks as persisted or retrieved from the computer resources 859. This results in one or more normalized data blocks 854.

The data plane may optionally apply data services 855 to the normalized data blocks 854 resulting in, for example, encoded data blocks 856.

The data plane may optionally look up configuration data from the control plane to determine routing and abstraction of the data block 857 to a number of persistence plugins 858. The storage system may include multiple different persistence plugins 858, which provide support for multiple different computer resources such that the storage system can utilize different types of computer resources that might consist of different physical storage media, formats, or protocols.

Normalizing Blocks of Data

In an embodiment, requests to retrieve or persist data blocks are normalized. For example, with reference to FIG. 6 requests to retrieve or persist data blocks are normalized by the request normalization function 954 within the data plane 950 of the storage system 970.

Figure 11A:
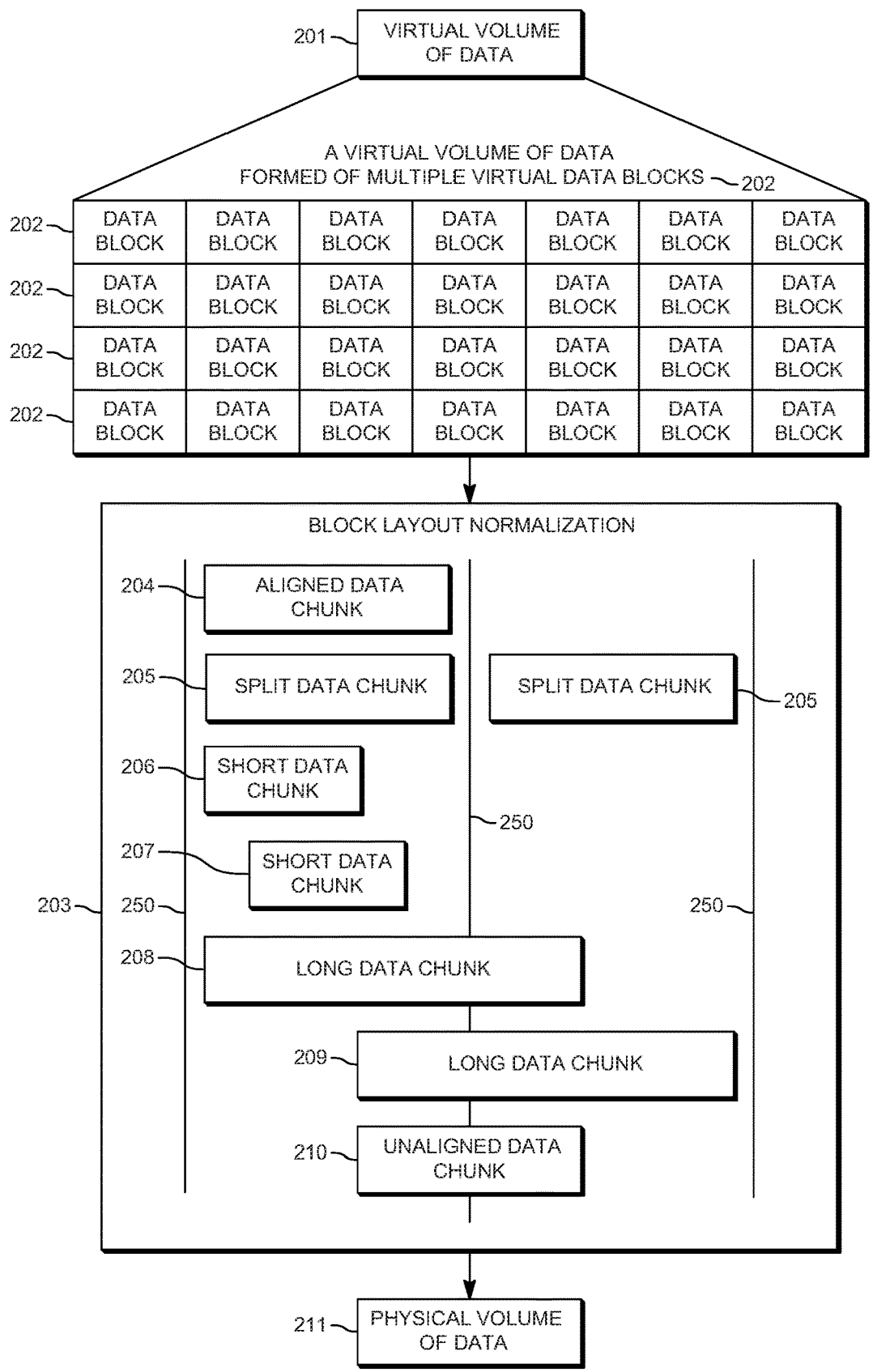
FIG. 11A illustrates an example of normalizing blocks from a virtual volume of data.
Figure 11B:
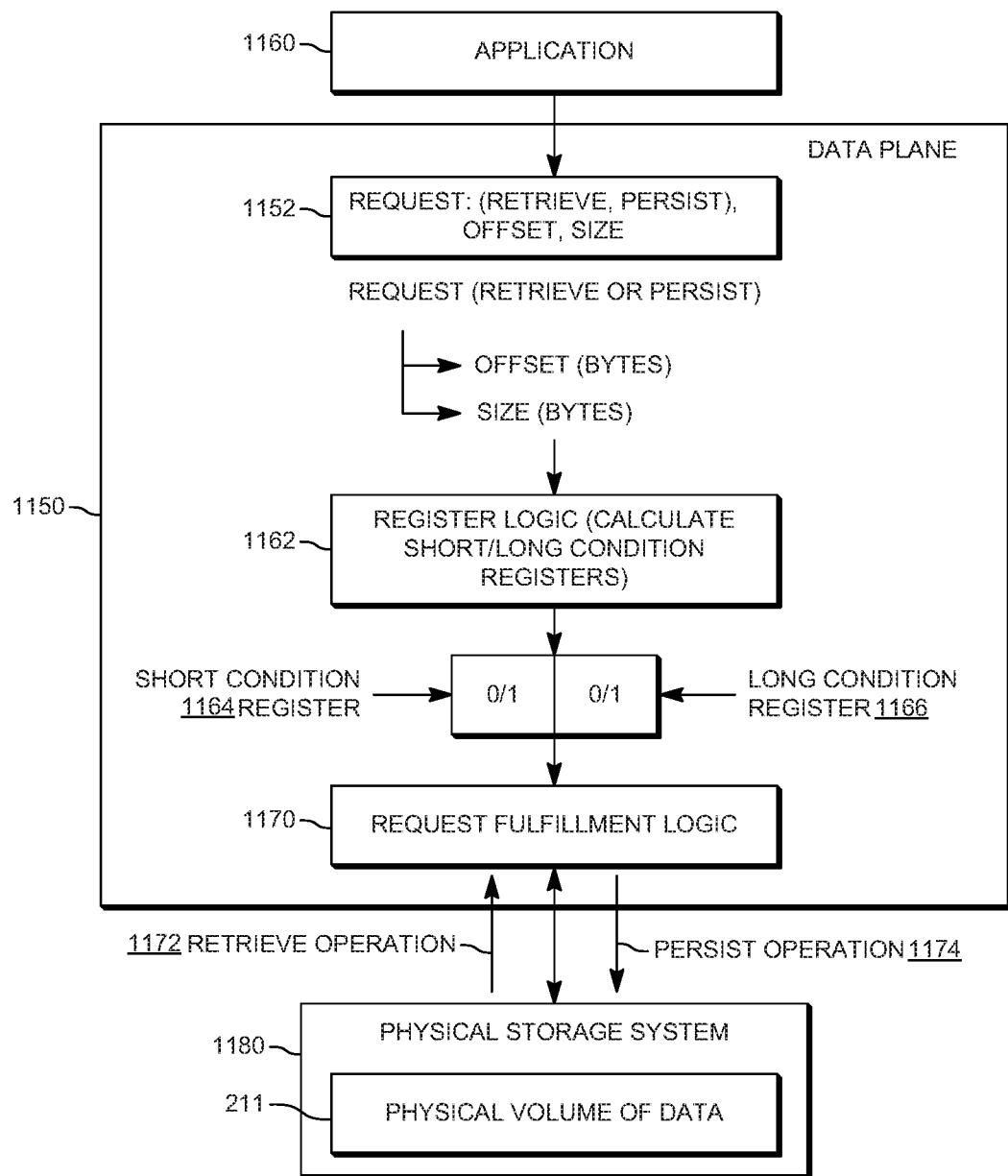
FIG. 11B illustrates an example system for normalizing blocks from a virtual volume of data.

FIGS. 11A and 11B illustrate a technique for normalizing requests for chunks of data in order to map requests to retrieve or persist data in a computer system that may not match to blocks of data as represented in computer resources. The technique described with reference to FIGS. 11A and 11B is described with reference to a virtual volume of data but the technique is also applicable to a physical volume of data. With reference to FIG. 11A, a virtual volume of data 201 is represented as a number of virtual blocks of data 202 that need to be normalized (block layout normalization 203) in order to retrieve or persist the data from/to a physical volume of data 211. In an embodiment, a virtual volume of data is a volume of data that is not tied to a specific physical storage medium. The virtual volume of data can exist independent of the configuration of an underlying storage system in which a corresponding physical volume of data is stored. For example, the virtual volume of data 201 is abstracted from the underlying physical volume of data 211 (e.g., including a virtual-to-physical mapping and a physical-to-virtual mapping) such that an application can interact with the virtual volume of data (e.g., via requests to retrieve data from the virtual volume of data and requests to persist data to the virtual volume of data) without any knowledge of the operation and/or existence of the underlying physical volume of data. Similarly, in an embodiment, virtual blocks of data are not tied to a specific physical storage medium and can exist independently of the configuration of the underlying storage system. Additionally, the virtual volume of data 201 and the virtual data blocks 202 are what the application uses to persist data. For example, the application has knowledge of the virtual volume of data and of the virtual data blocks but no knowledge of any underlying storage system. In the embodiment of FIG. 11A, the blocks of data 202 are of a fixed size. For example, the blocks are 4 kilobytes (kB) each in size and the beginning and end of each block corresponds to a block boundary. Thus, if the block size is 4 kB, then block boundaries exist at 4 kB increments from the start position of the volume of data.

Examples of requested blocks of data relative to block boundaries 250 of the virtual volume of data 201 are illustrated in the block layout normalization 203 in FIG. 11A. As used herein, a block of data that is the subject of a request from an application may be referred to as a "chunk" of data to distinguish the chunk of data from the (fixed size) blocks of data that are delineated by the block boundaries 250 within the virtual volume of data 201. Examples of requested chunks of data relative to block boundaries 250 of the virtual volume of data 201 are illustrated in FIG. 11A. The example requested chunks of data include:

requested chunk of data 204 that is perfectly aligned to a block boundary 250 of the virtual volume of data 201 or a requested chunk of data 205 that is split into multiple blocks across multiple data block boundaries 250;

a requested chunk of data 206 that is short aligned, where the chunk of data is aligned to the start of a block (e.g., to a block boundary 250 of the virtual volume of data 201) but is shorter than the size of a data block (thus, the chunk of data does not cross a block boundary 250 of the virtual volume of data 201);

a requested chunk of data 207 that is short (e.g., the chunk has fewer bytes than the size of a block) and is not aligned with a block boundary 250 of the virtual volume of data, where the data chunk is formed of a partial block (and the chunk of data does not cross a block boundary 250 of the virtual volume of data 201);

a requested chunk of data 208 that is longer than a single data block, where the data chunk is aligned to the start of a block boundary 250 of the virtual volume of data 201 but is larger than a single block (and thus crosses a block boundary 250 of the virtual volume of data 201);

a requested chunk of data 209 that is longer than a single data block and not aligned with a block boundary 250 of the virtual volume of data 201, where the data chunk is larger than a single block (and thus crosses a block boundary 250 of the virtual volume of data); and a requested chunk of data 210 that is not aligned with a block boundary 250 of the virtual volume of data 201, where the requested data chunk is placed across multiple blocks (and thus crosses a block boundary 250 of the virtual volume of data 201).

In an embodiment, a chunk of data is aligned with a block boundary 250 of the virtual volume of data 201 if the start and/or end of the chunk of data is located at a block boundary, e.g., at the byte of the block boundary. For example, with a 4 kB block size, a chunk of data is aligned with a block boundary if the start or end of the chunk of data is located at the first byte of a block, e.g., with block 0-4096 and block 4097-8192, a chunk of data is aligned with the second block if the offset for the chunk of data is 4097. In other embodiments, a chunk of data is aligned with a block boundary 250 of the virtual volume of data 201 if the start and/or end of the chunk of data is located within a certain number of bytes to a block boundary, e.g., within 0-10% or within 0-1% of the total block size to a block boundary. For example, with a 4 kB block size, a chunk of data is aligned with a block boundary if the start or end of the chunk of data is located within 0.4 kB of a block boundary.

In one embodiment, the block layout normalization process will process requests to retrieve or persist chunks of data in a sequence and will map the requested data chunks to a data block or data blocks held in the computer system memory for processing. For example, a requested chunk of data is mapped to a data block or multiple data blocks 202 (depending on the size of the requested chunk of data) in the virtual volume of data 201. As illustrated in FIG. 11A, requested chunks of data 204, 206, and 207 are mapped to a single data block 202 in the virtual volume of data 201 and requested chunks of data 205, 208, 209, and 210 are mapped to two data blocks 202 in the virtual volume of data 201.

In an embodiment, the request normalization function 954 (FIG. 6) of the data plane 950 will establish register values that reflect the position of the requested chunk of data (e.g., a request to retrieve a chunk of data from the virtual volume of data 201 or a request to persist a chunk of data to the virtual volume of data 201) relative to block boundaries 250 of the corresponding volume of data, e.g., virtual volume of data 201. For example, the request normalization function of the data plane would calculate the output of a pair of register conditions for each request to retrieve or persist a chunk of data. One condition register, referred to as the "short condition register," is used to signify a short condition and a second condition register, referred to as the "long condition register," is used to signify a long condition. In an embodiment, the short and long condition registers are calculated as follows:

short condition register—if the current offset for the requested chunk of data is larger than the offset for an aligned chunk of data or if the total of the current offset for the requested chunk of data and the remaining size of the requested chunk of data is less than the end of the aligned data block (e.g., the chunk of data does not cross a block boundary 250 of the virtual volume of data 201), then a short condition is registered (e.g., the short condition register is set to "1"). Otherwise, the short condition register is "0," e.g., a short condition is not registered;

long condition register—if the total of the current offset for the requested chunk of data and the remaining size of the requested chunk of data is more than the end of the aligned data block (e.g., the chunk of data does cross a block boundary 250 of the virtual volume of data 201), then a long condition is registered (e.g., the long condition register is set to "1"). Otherwise, the long condition register is "0," e.g., the long condition is not registered.

With regard to FIG. 11A, a short condition would be registered (e.g., the short condition register is set to "1") for data chunks 206, 207, 209, and 210 and a long condition would be registered (e.g., the long condition register is set to "1") for data chunks 205, 208, 209, and 210. Table 1 indicates the settings of the corresponding short and long condition registers for the chunks of data shown in FIG. 11A.

TABLE 1

|  | short condition register | long condition register |
|---|---|---|
| chunk of data 204 | 0 | 0 |
| chunk of data 205 | 0 | 1 |
| chunk of data 206 | 1 | 0 |
| chunk of data 207 | 1 | 0 |
| chunk of data 208 | 0 | 1 |
| chunk of data 209 | 1 | 1 |
| chunk of data 210 | 1 | 1 |

FIG. 11B illustrates an example of the request normalization process that is executed (e.g., by request normalization function 954, FIG. 6) in the data plane of a storage system. As shown in FIG. 11B, a request 1152 to retrieve a chunk of data from the virtual volume of data 201 (not shown in FIG. 11B) or to persist a chunk of data to the virtual volume of data is received at the data plane 1150 from an application 1160. In the example, the request is identified as a retrieve request or a persist request and the request includes an offset and a size corresponding the requested chunk of data, where the offset is, for example, an offset (e.g., in bytes or kB) from a start location of the virtual volume of data and the size is a size (e.g., in bytes or kB) of the corresponding chunk of data. The request is then processed by register logic 1162 to calculate the short condition register 1164 and the long condition register 1166 that correspond to the request. For example, the short/long condition registers are calculated based on the above-identified rules. In the case where the short condition register is a single bit and the long condition register is a single bit, the short and long condition registers are set to either "0" or "1" based on the above-described rules, resulting in a 2-bit register being generated for a request. The request (to either retrieve a chunk of data (retrieve operation 1172) or to persist a chunk of data (persist operation 1174)) is then processed by request fulfillment logic 1170 according to the rules described below. In an embodiment, the register logic 1162 and the request fulfillment logic 1170 are components of and/or implemented by the persistence manager 957 (FIG. 6) in the data plane 950 (FIG. 6).

Retrieve Request

Upon receiving a request to retrieve a chunk of data from the virtual volume of data 201, the data plane 1150 (e.g., the request fulfillment logic 1170 of the data plane) checks the short and long condition registers 1164 and 1166 and adopts different methods for retrieving the chunk of data from the virtual volume of data 201 (and ultimately from the underlying physical volume of data 211 in physical storage system 1180) as a function of the values of the short and long condition registers. For example:

if neither the short or long condition registers are set for a request (e.g., short condition register=0 and long condition register=0), then the requested chunk of data is perfectly aligned with a block boundary 250 in the virtual volume of data 201. The data plane can retrieve the corresponding data block 202 from the virtual volume of data 201 and satisfy the retrieval request;

if only the short condition is registered (e.g., short condition register=1 and long condition register=0), then the data plane retrieves an entire corresponding data block 202 from the virtual volume of data 201 but only returns a subset of the block to the application to satisfy the request;

if only a long condition is registered (e.g., short condition register=0 and long condition register=1), then the data plane retrieves two data blocks 202 from the virtual volume of data 201, combines the data from the two blocks, and then returns the combined data to the application to satisfy the request;

if both the short and long conditions are set (e.g., short condition register=1 and long condition register=1), then both modes of operations are implemented in parallel, e.g., the data plane retrieves two data blocks 202 from the virtual volume of data 201 and returns only a subset of at least one block to the application to satisfy the request.

Persist Request

Upon receiving a request to persist a chunk of data to the virtual volume of data 201, the data plane 1150 (e.g., the request fulfillment logic 1170 of the data plane) checks the condition registers and adopts different methods for persisting the chunk of data to the virtual volume of data 201 (and ultimately to the underlying physical volume of data 211 in physical storage system 1180) as a function of the state of the values of the short and long condition registers. For example:

if neither the short or long condition registers are set (e.g., short condition register=0 and long condition register=0), then the chunk of data is perfectly aligned with a block boundary 250 in the virtual volume of data 201. The data plane can persist the data block and satisfy the persistence request;

if only a short condition is registered (e.g., short condition register=1 and long condition register=0), then the data plane retrieves the entire corresponding data block 202 from the virtual volume of data 201 into an in-memory data block and amends a subset of the in-memory block with the requested persistence data block and then commits the whole modified in-memory data block to the virtual volume of data 201;

if only a long condition is registered (e.g., short condition register=0 and long condition register=1), then the data plane retrieves two full sequential corresponding blocks of data 202 from the virtual volume of data 201 into a pair of in-memory data blocks and amends a subset of the first and second in-memory blocks with the requested persistence chunk of data and commits both of the modified in-memory data blocks to the virtual volume of data 201;

if both the short and long conditions are set (e.g., short condition register=1 and long condition register=1), then both modes of operation are implemented in parallel. For example, two full sequential corresponding blocks of data 202 are retrieved from the virtual volume of data 201 into in-memory and a subset of one in-memory block is amended and two blocks are stored/persisted to the virtual volume of data.

Although the example described with reference to FIGS. 11A and 11B is described relative to a virtual volume of data, the technique of using a short condition register and a long condition register to manage requests is also applicable to a physical volume of data. Additionally, although the technique is described with reference to a chunk of data that covers only one or two blocks of data in a volume of data, the technique is applicable to request for chunks of data that cover more than two blocks of data in a virtual volume of data.

Figure 11C:
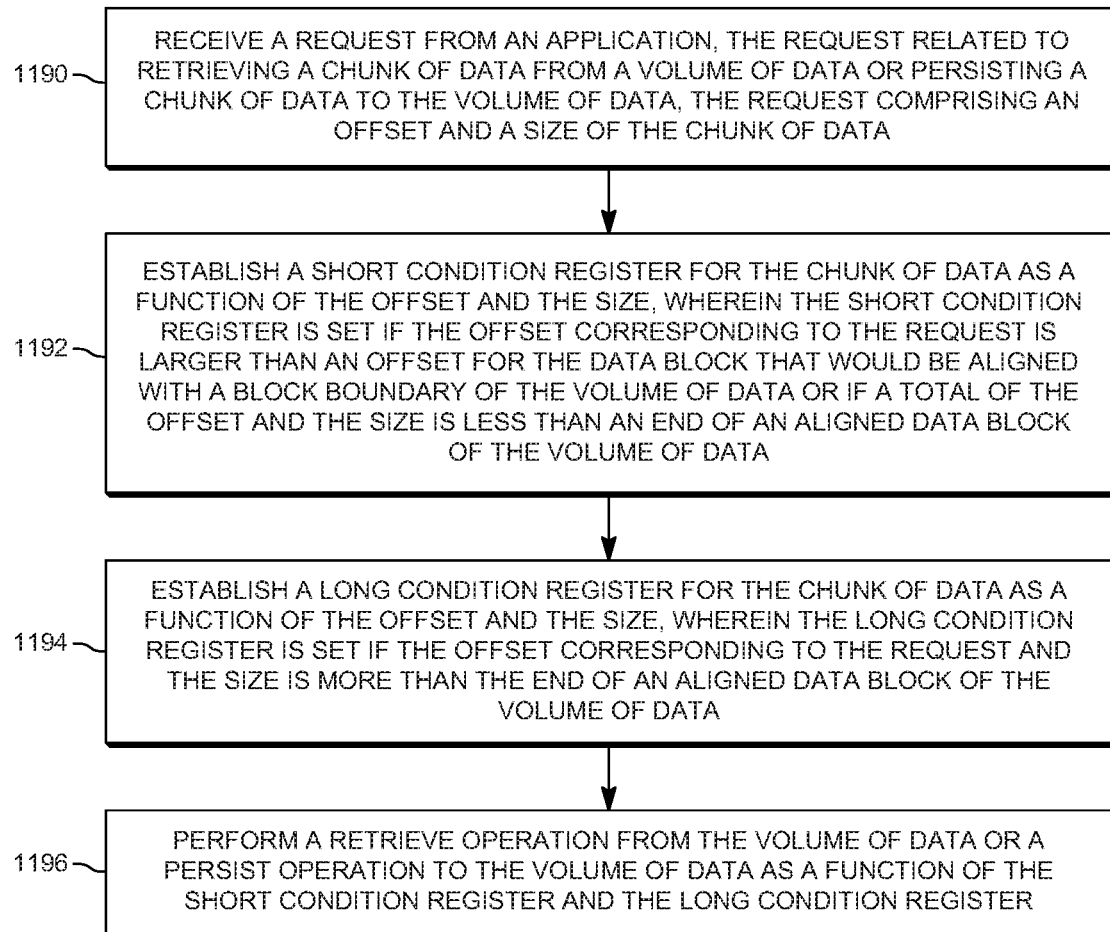
FIG. 11C is a process flow diagram of a method for handling requests for data corresponding to a volume of data.

FIG. 11C is a process flow diagram of a method for handling requests for data corresponding to a volume of data. The method involves, at block 1190, receiving a request from an application, the request related to retrieving a chunk of data from a volume of data or persisting a chunk of data to the volume of data, the request comprising an offset and a size of the chunk of data, at block 1192, establishing a short condition register for the chunk of data as a function of the offset and the size, wherein the short condition register is set if the offset corresponding to the request is larger than an offset for the data block that would be aligned with a block boundary of the volume of data or if a total of the offset and the size is less than an end of an aligned data block of the volume of data, at block 1194, establishing a long condition register for the chunk of data as a function of the offset and the size, wherein the long condition register is set if the offset corresponding to the request and the size is more than the end of an aligned data block of the volume of data, and at block 1196, performing a retrieve operation from the volume of data or a persist operation to the volume of data as a function of the short condition register and the long condition register.

Configuration for Persistence Plugins

Figure 8:
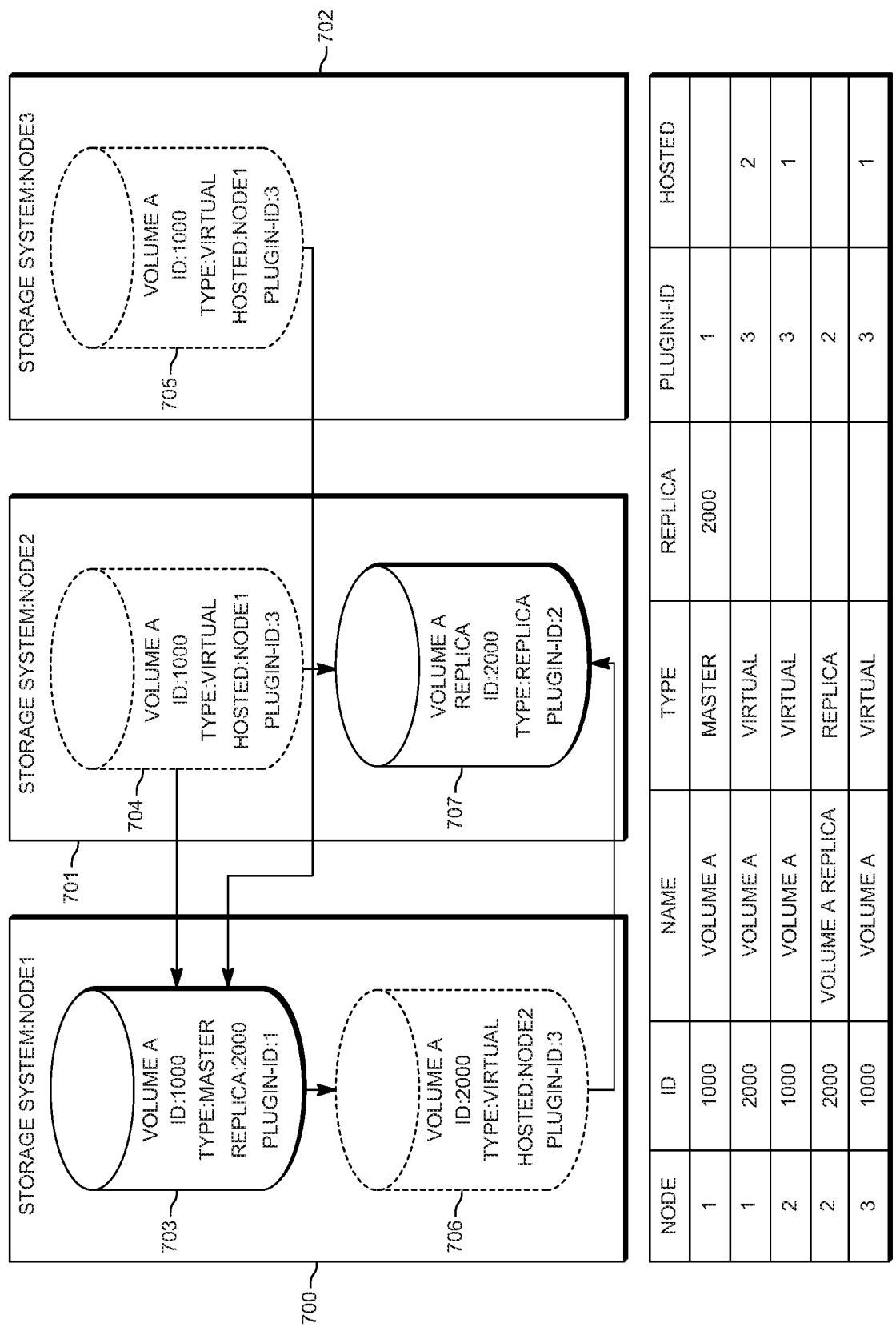
FIG. 8 illustrates an example of a representation of a data plane configuration in both a logical form and in a table form.

FIG. 8 illustrates an example of a representation of a data plane configuration in both a logical form and in a table form. The data plane of the storage system is present on three separate computer systems or nodes identified as node 1 700, node 2 701, and node 3 702. FIG. 8 depicts an example configuration and in particular may include:

more or less than 3 nodes;
1 or more persistence plugins;
1 or more volumes;
0 or more replica volumes per system and per master volume;
0 or more virtual volumes.

In an embodiment, the configuration for a volume 703 includes a plurality of configuration entries as illustrated in the table in FIG. 8. A volume can be instantiated in the data plane in a plurality of modes, including:

master mode volume 703 where data is authoritatively persisted and retrieved for a given volume;

virtual mode volume 704 and 705, which may be defined on other nodes in the distributed computer system and may include configuration information that would allow the direct access method for volume 704 or 705 to determine the node 700 that contains the master mode volume of data. The virtual mode volumes allow a volume of data to be accessible from different nodes 701 and 702;

replica mode volume 707, which is defined as a replica for a master mode volume 703. A storage system may need to implement a replica of a volume of data such that the volume of data would be accessible to retrieve and persist data blocks in the event that the node 700 hosting the master mode volume 703 is no longer available due to any number of failure conditions. The node 700 hosting the master node volume would utilize a virtual mode volume 706 to replicate all requests to persist a block of storage to the replica volume 707.

In one embodiment, a virtual mode volume may be accessible from multiple nodes simultaneously. In another embodiment, the control plane would be able to detect the failure of a node such that when the node (e.g., node 700) failed, the virtual mode volumes on the surviving nodes (e.g., nodes 701 and 702) would be reconfigured to connect to the replica mode volume. In another embodiment, the configuration may be extended to be utilized as a remote access path utilizing the direct access client volume access method and the direct access server persistence plugin method as illustrated in FIG. 9. FIG. 9 depicts three separate computer systems 800, 810, and 820, each with its own operating system 801, 811, and 821, respectively. The computer system 800 includes an application 802 (application A) and a storage system component 803 (storage system: client) executing using the corresponding operating system and computing resources. The computer system 810 includes a storage system component 813 (storage system: Node1), an application 812 (application B), a volume of data 814 (volume A), and a volume of data 815 (volume B) executing using the corresponding operating system and computing resources. The computer system 820 includes a storage system component 822 (storage system: Node2), a replica volume 823 (replica volume A), and a replica volume 824 (replica volume B) executing using the corresponding operating system and computing resources. As illustrated in FIG. 9, the storage system: client 803 communicates with the storage system: Node 1 813 and storage system: Node2 822 and the volumes of data communicate directly with the corresponding storage system running on the same operating system.

Improving Storage Efficiency

When persisting a block of data, the data plane (e.g., data plane 950, FIG. 6) as embodied herein may optionally implement a number of methods to improve efficiency of the computer resources that are utilized. For example, reducing the number of operations and the number of data blocks that are persisted to and retrieved from the computer resources, the data plane can improve the performance of the storage system. Additionally, methods can be utilized to ensure that only the minimum number of data blocks required to retrieve data from a volume are actually persisted to the volume of data.

Figure 10A:
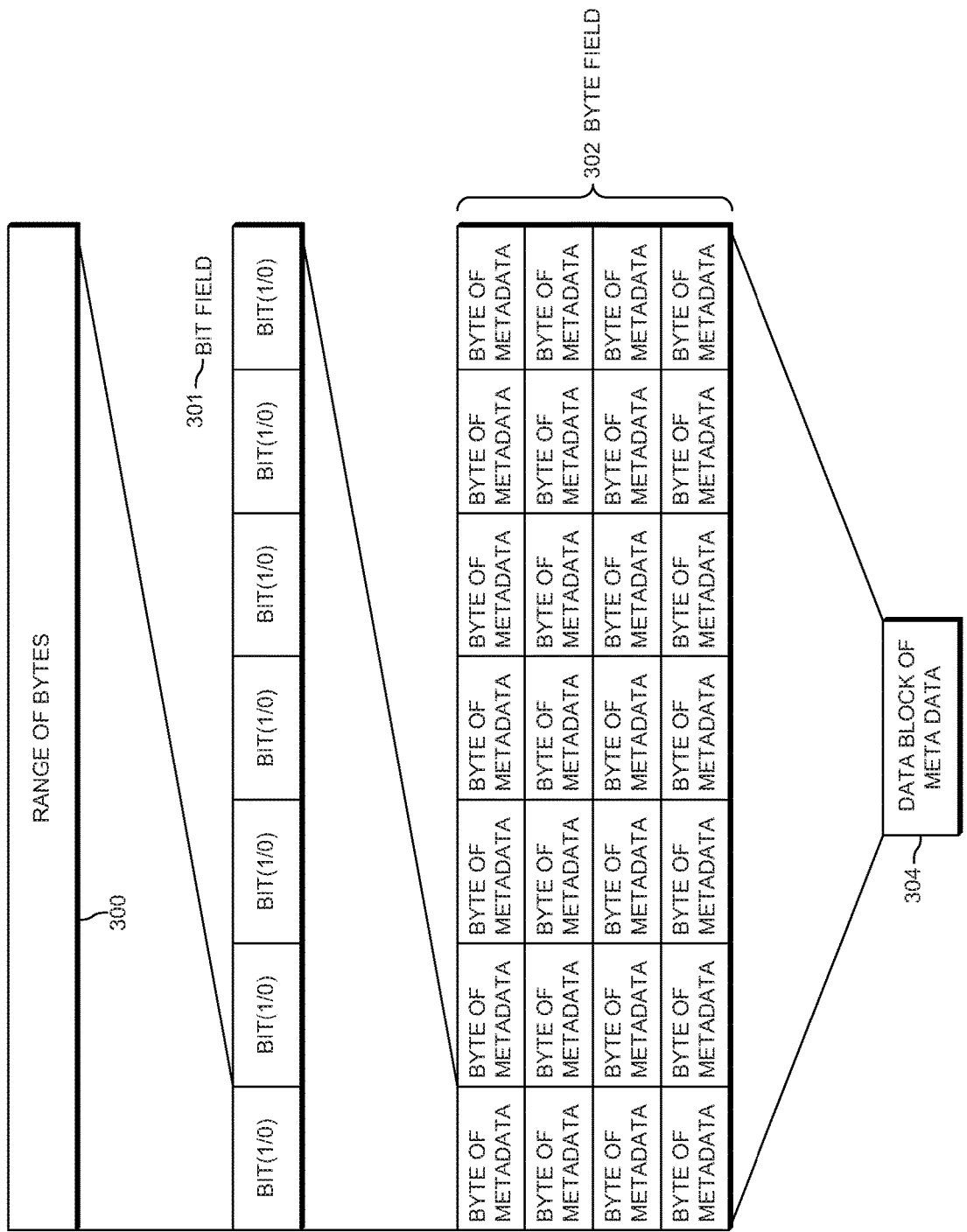
FIG. 10A illustrates an example of a technique for efficiently representing utilization of blocks within a virtual storage system.

FIG. 10A illustrates an efficient way for the data plane to track which data blocks are active in a given volume of data by efficiently tracking the range of blocks utilized. For example, an "active" data block is a data block within which some data has previously been persisted since the corresponding volume of data was established. In an embodiment, this would be implemented by maintaining a bit field 301, also referred to as meta data, which would be referenced by the data plane during execution of retrieve operations and/or persist operations. The bit is the smallest representation of data in a computer system with a byte of data being formed of 8 bits. In an embodiment, the data plane would represent a range of bytes or blocks 300 of data in the bit field 301. For example, each range of bytes or blocks 300 would be accounted for by setting a single bit in the bit field 301, where each bit corresponds to a range of bytes or blocks 300 in a sequence and the value of a bit corresponds to the activity status of the corresponding range of bytes or blocks. For example, if the range status register for a corresponding range of bytes or blocks is "0," then the corresponding range of bytes or blocks has not had data persisted within the range of bytes or blocks, and if the range status register for a corresponding range of bytes or blocks is "1," then the corresponding range of bytes or blocks has had data persisted within the range of bytes or blocks.

The resolution of the range of bytes that corresponds to a range status register can be specified or can be determined by the storage system. One way to determine the range of bytes or blocks could be defined by dividing the maximum size of the volume of data by the desired resolution of the range of bytes or blocks 300. Another way to determine the size of a range of bytes or blocks could be by dividing the available bits of meta data by the maximum size of the volume.

Once data is persisted in a range of bytes, the appropriate bit from the bit field 300 is set by the data plane (e.g., the range status bit is changed from "0" to "1"). The set of bits are grouped together in a byte field 302 representing the meta data for the volume of data. A number of bytes in the byte field 302 can be grouped together into a data block that can be persisted and retrieved within the volume of data. If the number of bytes in the byte field 302 exceeds the size of the data block 304, the field of bytes 302 can be persisted in multiple blocks of data. By retrieving the block or blocks of meta data 304 from a storage system, the data plane is able to determine which ranges of data blocks contain data blocks that have been utilized by the computer applications, databases, or files, e.g., which data blocks have been "active" as indicated by the corresponding range status registers.

The data plane can utilize the meta data when retrieving blocks from a volume of data. For example, when retrieving a data block from a virtual volume of data:

if the meta data bit for the data block being requested falls in a range 300 not covered by a set bit in the bit field 301 (e.g., the corresponding range status register=0), then the data plane can authoritatively determine that the block does not exist and can return an empty data block to the computer application (e.g., a block of zeros);

if the data block retrieval from the volume of data fails due to the data block not being present, the data plane can also return an empty data block to the computer application;

if the meta data bit for the data block being requested falls in a range 300 covered by a set bit in the bit field 301 (e.g., the corresponding range status register=1), then the data plane can retrieve the requested block.

The data plane can utilize the meta data when persisting blocks to the volume of data. For example, when persisting a data block:

The data plane can utilize the meta data when persisting blocks to the volume of data. For example, when persisting a data block:

if the meta data bit for the data block being persisted falls in a range 300 not covered by a set bit in the bit field 301 (e.g., the corresponding range status register=0) and the data block is formed entirely of zeros, then the request to persist the block can be safely ignored (e.g., because it is known from the state of the corresponding range status register that the corresponding locations in the volume of data are already all zeros);

if the meta data bit for the data block being persisted falls in a range 300 covered by a set bit in the bit field 301 (e.g., the corresponding range status register=1) and the data block is formed entirely of zeros, then the request to persist the block can be translated into a request to delete the block and the data block can be removed from the volume of data thus recovering capacity in the computer system;

if the persistence request is to delete a block of data and the meta data bit for the data block being persisted falls in a range 300 not covered by a set bit in the bit field 301 (e.g., the corresponding range status register=0), then the delete can be safely ignored (e.g., because it is known from the state of the corresponding range status register that the corresponding locations in the volume of data are already all zeros).

Figure 10B:
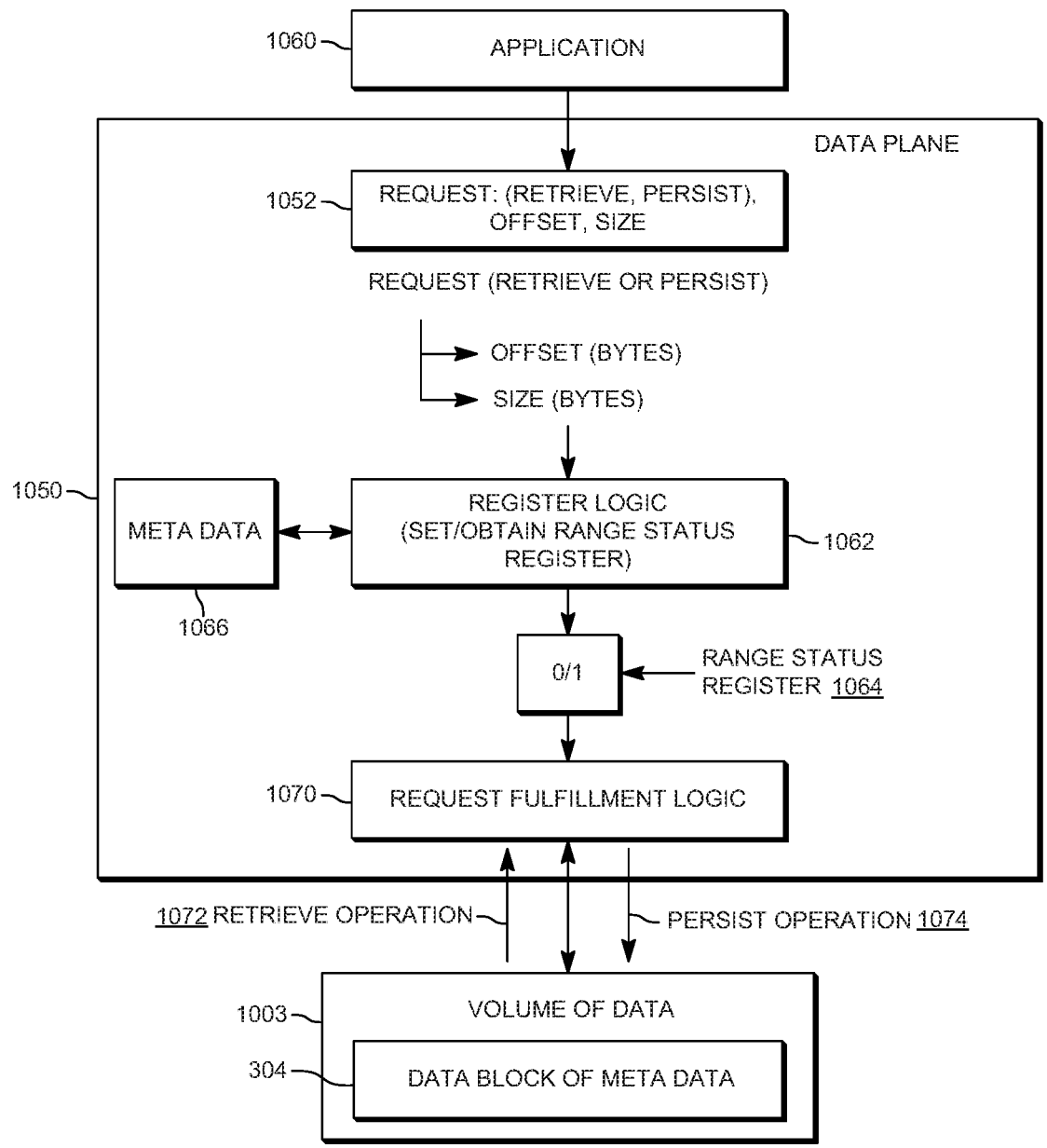
FIG. 10B illustrates an example system for using a range status register to retrieve data from and/or persist data to a volume of data.

FIG. 10B illustrates an example of the request processing that is executed (e.g., by persistence manager 957, FIG. 6) in the data plane of a storage system. As shown in FIG. 10B, a request 1052 to retrieve a chunk of data from a volume of data 1003 or to persist a chunk of data to the volume of data 1003 is received at the data plane 1050 from an application 1060. In the example, the request is identified as a retrieve request or a persist request and the request includes an offset and a size, where the offset is, for example, an offset (e.g., in bytes or kB) from a start location of the virtual volume of data and the size is a size (e.g., in bytes or kB). The request is then processed by register logic 1062 to obtain a range status register 1064 that corresponds to the request. For example, the range status register is held as meta data 1066 in the data plane. As described above, the meta data can also be persisted to a volume of data (e.g., to volume of data 1003) as a data block of meta data 304. The request (to either retrieve a chunk of data (retrieve operation 1072) or to persist a chunk of data (persist operation 1074)) is then processed by request fulfillment logic 1070 according to the above-described rules. That is, the request fulfillment logic takes into account the value of the range status register 1064 in fulfilling the request In an embodiment, the register logic 1062 and the request fulfillment logic 1070 are components of and/or implemented by the persistence manager 957 (FIG. 6).

The technique described above with reference to FIGS. 10A and 10B is applicable to virtual volumes of data and to physical volumes of data. In an embodiment, once a range status register is set (e.g., set to "1") for a range of bytes or blocks, the range status register remains set (e.g., set to "1") for the remainder of the lifetime of the volume of data.

Figure 10C:
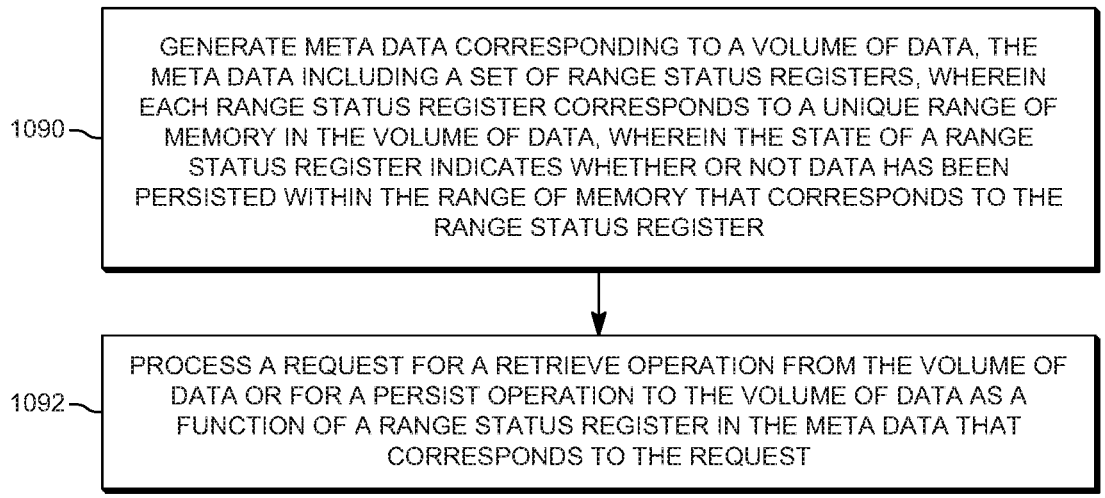
FIG. 10C is a process flow diagram of a method for handling requests for data corresponding to a volume of data.

FIG. 10C is a process flow diagram of a method for handling requests for data corresponding to a volume of data. The method involves, at step 1090, generating meta data corresponding to a volume of data, the meta data including a set of range status registers, wherein each range status register corresponds to a unique range of memory in the volume of data, wherein the state of a range status register indicates whether or not data has been persisted within the range of memory that corresponds to the range status register and at step 1092, processing a request for a retrieve operation from the volume of data or for a persist operation to the volume of data as a function of a range status register in the meta data that corresponds to the request.

In an embodiment, the action of "persisting" data involves storing data such that the data will exist from session to session. Persistent data can be contrasted with transient data in which the data is lost from session to session. In an embodiment, persistent memory, which is used to "persist" data, involves data structures that are stored such that the data structures can continue to be accessed, by for example a computer application, using memory instructions or memory Application Programming Interfaces (APIs) even after the process that created (or last modified) the data has ended. In an embodiment, persisted data is stored on non-volatile memory such as a magnetic disk drive or a solid state drive (SSD). In an embodiment, persisted data is data that is stored such that the data exists outside of the application that created the data, such that the data can be recalled after the current instance of the application has been ended. In an embodiment, data is persisted when an application transfers the data to a storage system and provides mappings from the native programming language data structures of the application to date structures of the storage device.

As used herein, a computer application, an application program, or simply an application, may be a software program that runs on a computer and is the most common software on computers. Web browsers, e-mail programs, word processors, and databases are all example of computer applications. In an embodiment, an application is a containerized application in which, for example, operating system level virtualization is used to run distributed applications without launching an entire virtual machine for each instance of an application. In an embodiment, the above-described virtual storage system, including the control plane and the data plane, is implemented as a containerized application.

As used herein, a file may be a collection of digital data stored in one unit, identified by a filename. The file can be a document, picture, audio or video stream, a data library, application, or another collection of data.

As used herein, a database may be a data structure that stores information and data that is organized to allow easy retrieval of the information. Typical databases contain multiple structures called tables, which may each include several different fields of data. For example, a company database may include tables for products, employees, and financial records. Each of the tables may have different fields that are relevant to the information stored in the table.

As used herein, a storage system may be a collection of computers, software applications, and storage devices that together operate to provide the persistence and retrieval of data from storage devices to and from computer applications and databases.

As used herein, a data block, a block of data, or simply a "block," is a sequence of bytes or bits, typically containing some whole number of records, that has a maximum length, e.g., a block size. The process of putting data into blocks is called blocking, while deblocking is the process of extracting data from blocks. Blocked data is normally stored in a data buffer and read or written a whole block at a time. Blocking can reduce the overhead in storage systems and can speed up the handling of a data-stream. Blocking is usually implemented when storing data to 9-track magnetic tape, to NAND flash memory, and to rotating media such as hard disks and optical disks. Most file systems are based on a block device, which provides a level of abstraction for the hardware responsible for storing and retrieving specified blocks of data, though the block size in file systems may be a multiple of the physical block size. Block storage is typically abstracted by the file system or database management system (DBMS) for use by computer applications and end users.

As used herein, a volume of data is a single accessible storage area with a single file system, typically, though not necessarily, residing on a single partition of a hard disk. In an embodiment, a volume of data can be different from a physical disk drive, however, the volume of data can be accessed with an operating system's logical interface. A volume of data is a logical representation of a number of data blocks, which data blocks are concatenated to form a larger set of data than can be stored as a group of data blocks. A volume of data is not the same as a partition in computer storage. For example, a floppy disk might be accessible as a volume, even though the floppy disk does not contain a partition, as floppy disks cannot be partitioned with most modern computer software. Furthermore, an operating system can recognize a partition without recognizing any volume associated with the partition, as when an operating system cannot interpret the filesystem stored there. Volumes of data exist at the logical operating system level while partitions exist at the physical, media specific level. Sometimes there is a one-to-one correspondence, but this is not a requirement. In Unix-like operating systems, volumes other than the boot volume have a mount-point somewhere within the filesystem, represented by a path. Logically, the directory tree stored on the volume is grafted in at the mountpoint. By convention, mount-points will often be placed in a directory called '/mnt', though '/media' and other terms are sometimes used. Files within a volume of data can generally be moved to any other place within that volume by manipulating the filesystem, without moving the actual data. However, if a file is to be moved outside the volume, the data itself must be relocated, which is a much more expensive operation.

Additionally, a method and/or system for accessing virtual volumes of data through a virtual storage system including a control plane and a data plane are disclosed. The method and/or system further includes running the virtual storage system alongside other computer applications in a computer system. The method and/or system further includes abstracting and normalizing the retrieval and persistence of virtual volumes of data to map to different types of physical computer resources. The method and/or system further includes using the virtual storage system to connect to other virtual storage systems using direct access methods such that a computer system can access a virtual volume of data that resides on another computer system. The method and/or system further includes using direct access methods to replicate data to computer resources in another computer system. The method and/or system further includes a control plane to define the configuration for a data plane defining the persisting of virtual volumes of data. The method and/or system further includes a control plane to define the configuration for a data plane defining the routing of virtual volumes of data. The method and/or system further includes normalizing requests to retrieve or persist data from virtual volumes of data to physical data blocks. The method and/or system further includes a data plane in a storage system to calculate a short condition register based on the size and alignment of the data blocks. The method and/or system further includes a data plane in a storage system to calculate a long condition register based on the size and alignment of the data blocks. The method and/or system further includes processing a data block retrieval request for a virtual volume of data. The method further includes processing a data block persistence request for a virtual volume of data. The method and/or system further includes providing access to a virtual volume of data on multiple computer systems concurrently. The method and/or system wherein the control plane of a storage system reconfigures the data plane such that a volume of data would be accessible by other computer systems should one of the computer systems hosting the physical resources failed. The method and/or system further includes generating an efficient index of the utilization of ranges of blocks in a storage system. The method and/or system further includes storing the index of utilized block ranges in a block of data. The method and/or system further includes storing the index of utilized block ranges in multiple blocks of data. The method and/or system further includes reducing the number of retrieved blocks from a physical volume of data based on the content of the index should the index indicate a block cannot exist, where the data plane returns an empty block instead. The method and/or system further includes reducing the number of retrieved blocks from a physical volume of data based on the existence of a block where the data plane returns an empty block instead. The method and/or system further includes comprising reducing the number of persisted blocks to a physical volume of data based on the content of the index should the index indicate a block cannot exist and the data block is formed entirely of zeros. The method and/or system further includes deleting a block of data in a physical volume of data based on the content of the index should the index indicate a block cannot exist and the data block is formed entirely of zeros thus recovering capacity in the computer system. The method and/or system further including reducing the number of delete requests to a physical volume of data based on the content of the index should the index indicate a block cannot exist allowing the data plane to safely ignore such delete requests.

It should also be noted that at least some of the operations for the methods may be implemented using software instructions stored on a non-transitory computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or non-transitory computer-readable medium providing computer executable instructions, or program code, for use by or in connection with a computer or any instruction execution system. For the purposes of this description, a non-transitory computer-usable or computer readable medium can be any apparatus that can contain or store the program for use by or in connection with the instruction execution system, apparatus, or device.

The computer-useable or computer-readable medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

In an embodiment, the above-described functionality is performed at least in part by a computer or computers, which executes computer readable instructions. The computer may include a processor, memory, and a communications interface. The processor may include a multifunction processor and/or an application-specific processor. Examples of processors include the PowerPC™ family of processors by IBM and the x86 family of processors by Intel such as the Xeon™ family of processors and the Intel X5650 processor. The memory within the computer may include, for example, storage medium such as read only memory (ROM), flash memory, RAM, and a large capacity permanent storage device such as a hard disk drive. The communications interface enables communications with other computers via, for example, the Internet Protocol (IP). The computer executes computer readable instructions stored in the storage medium to implement various tasks as described above.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for handling requests for data corresponding to a volume of data, the method comprising:
   generating meta data corresponding to a volume of data, the meta data including a set of range status registers, wherein each range status register corresponds to a unique range of memory in the volume of data, wherein the state of a range status register indicates a status that is selected from available options of 1) data has not been persisted within the range of memory that corresponds to the range status register since the volume of data was established, and 2) data has been persisted within the range of memory that corresponds to the range status register, wherein, once the state of a range status register is set to state 2), the state of the range status register remains set to state 2) for the remainder of the lifetime of the volume of data;
   processing a request from an application for a retrieve operation from the volume of data or for a persist operation to the volume of data as a function of a range status register in the meta data that corresponds to the request;
   wherein processing a request for a retrieve operation from the volume of data involves, when the range status register corresponding to the request has been set to state 2), executing a retrieve operation from the volume of data and returning the requested data from the volume of data to the application; and
   wherein processing a request for a persist operation to the volume of data involves, when the range status register has been set to state 2) and the requested data is formed entirely of zeros, translating the request to persist into a request to delete the data, and further comprising deleting the data from the volume of data.

2. The method of claim 1, wherein processing a request for a retrieve operation from the volume of data involves:
   when the range status register corresponding to the request has not been set to state 2), returning an empty data block to the application without executing a retrieve operation from the volume of data, wherein the empty data block is a block of zeros.

3. The method of claim 1, wherein processing a request for a persist operation to the volume of data involves:
   when the range status register has not been set to state 2) and the requested data is formed entirely of zeros, ignoring the request for a persist operation; and
   when the range status register has not been set to state 2) and the request to persist involves a request to delete the data, ignoring the delete request.

4. The method of claim 1, wherein processing a request for a retrieve operation from the volume of data involves:
   when the range status register corresponding to the request has not been set to state 2), returning an empty data block to the application without executing a retrieve operation from the volume of data, wherein the empty data block is a block of zeros; and
   wherein processing a request for a persist operation to the volume of data involves:

when the range status register has not been set to state 2) and the requested data is formed entirely of zeros, ignoring the request for a persist operation; and when the range status register has not been set to state 2) and the request to persist involves a request to delete the data, ignoring the delete request.

5. The method of claim 1, further comprising storing the meta data, including the set of range status registers, in the volume of data.

6. The method of claim 1, wherein generating meta data corresponding to a volume of data comprises setting a range status register that corresponds to a unique range of memory in the volume of data once data has been persisted in the unique range of memory in the volume.

7. The method of claim 1, wherein the volume of data is a virtual volume of data.

8. The method of claim 1, wherein the volume of data is a physical volume of data.

9. A non-transitory computer readable medium that stores computer executable code, which when executed by one or more processors, implements a method for handling requests for data corresponding to a volume of data, the method comprising:

generating meta data corresponding to a volume of data, the meta data including a set of range status registers, wherein each range status register corresponds to a unique range of memory in the volume of data, wherein the state of a range status register indicates a status that is selected from available options of 1) data has not been persisted within the range of memory that corresponds to the range status register since the volume of data was established, and 2) data has been persisted within the range of memory that corresponds to the range status register, wherein, once the state of a range status register is set to state 2), the state of the range status register remains set to state 2) for the remainder of the lifetime of the volume of data;

processing a request from an application for a retrieve operation from the volume of data or for a persist operation to the volume of data as a function of a range status register in the meta data that corresponds to the request;

wherein processing a request for a retrieve operation from the volume of data involves, when the range status register corresponding to the request has been set to state 2), executing a retrieve operation from the volume of data and returning the requested data from the volume of data to the application; and wherein processing a request for a persist operation to the volume of data involves, when the range status register has been set to state 2) and the requested data is formed entirely of zeros, translating the request to persist into a request to delete the data, and further comprising deleting the data from the volume of data.

10. The non-transitory computer readable medium of claim 9, wherein processing a request for a retrieve operation from the volume of data involves:

when the range status register corresponding to the request has not been set to state 2), returning an empty data block to the application without executing a retrieve operation from the volume of data, wherein the empty data block is a block of zeros.

11. The non-transitory computer readable medium of claim 9, wherein processing a request for a persist operation to the volume of data involves:

when the range status register has not been set to state 2) and the requested data is formed entirely of zeros, ignoring the request for a persist operation; and when the range status register has not been set to state 2) and the request to persist involves a request to delete the data, ignoring the delete request.

12. The non-transitory computer readable medium of claim 9, wherein processing a request for a retrieve operation from the volume of data involves:

when the range status register corresponding to the request has not been set to state 2), returning an empty data block to the application without executing a retrieve operation from the volume of data, wherein the empty data block is a block of zeros; and wherein processing a request for a persist operation to the volume of data involves:

when the range status register has not been set to state 2) and the requested data is formed entirely of zeros, ignoring the request for a persist operation; and when the range status register has not been set to state 2) and the request to persist involves a request to delete the data, ignoring the delete request.

13. The non-transitory computer readable medium of claim 9, further comprising storing the meta data, including the set of range status registers, in the volume of data.

14. The non-transitory computer readable medium of claim 9, wherein generating meta data corresponding to a volume of data comprises setting a range status register that corresponds to a unique range of memory in the volume of data once data has been persisted in the unique range of memory in the volume.

15. The non-transitory computer readable medium of claim 9, wherein the volume of data is a virtual volume of data.

16. The non-transitory computer readable medium of claim 9, wherein the volume of data is a physical volume of data.

17. A method for handling requests for data corresponding to a volume of data, the method comprising:

receiving a request from an application to retrieve data from a volume of data or to persist data to the volume of data;

processing the request to retrieve data from the volume of data or to persist data to the volume of data as a function of a range status register that corresponds to the request;

the range status register held as meta data that includes a set of range status registers, wherein each range status register corresponds to a unique range of memory in the volume of data, wherein the state of a range status register indicates a status that is selected from available options of 1) data has not been persisted within the range of memory that correspond to the range status register since the volume of data was established, and 2) data has been persisted within the range of memory that corresponds to the range status register, wherein, once the state of a range status register is set to state 2), the state of the range status register remains set to state 2) for the remainder of the lifetime of the volume of data;

wherein processing a request for a retrieve operation from the volume of data involves, when the range status register corresponding to the request has been set to state 2), executing a retrieve operation from the volume of data and returning the requested data from the volume of data to the application; and wherein processing a request for a persist operation to the volume of data involves, when the range status register has been set to state 2) and the requested data is formed entirely of zeros, translating the request to persist into a request to delete the data, and further comprising deleting the data from the volume of data.

18. The method of claim 17, wherein processing a request for a retrieve operation from the volume of data involves:
when the range status register corresponding to the request has not been set to state 2), returning an empty data block to the application without executing a retrieve operation from the volume of data, wherein the empty data block is a block of zeros.

19. The method of claim 17, wherein processing a request for a persist operation to the volume of data involves:
when the range status register has not been set to state 2) and the requested data is formed entirely of zeros, ignoring the request for a persist operation; and
when the range status register has not been set to state 2) and the request to persist involves a request to delete the data, ignoring the delete request.

20. The method of claim 17, further comprising storing the meta data, including the set of range status registers, in the volume of data.

\* \* \* \* \*